(12) United States Patent
Kikuiri et al.

(10) Patent No.: US 7,505,900 B2
(45) Date of Patent: Mar. 17, 2009

(54) SIGNAL ENCODING APPARATUS, SIGNAL ENCODING METHOD, AND PROGRAM

(75) Inventors: Kei Kikuiri, Yokosuka (JP); Nobuhiko Naka, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 789 days.

(21) Appl. No.: 10/500,103

(22) PCT Filed: Dec. 25, 2002

(86) PCT No.: PCT/JP02/13513

§ 371 (c)(1),
(2), (4) Date: Jun. 25, 2004

(87) PCT Pub. No.: WO03/056546

PCT Pub. Date: Jul. 10, 2003

(65) Prior Publication Data

US 2005/0075872 A1    Apr. 7, 2005

(30) Foreign Application Priority Data

Dec. 25, 2001    (JP) .............................. 2001-392756

(51) Int. Cl.
*G10L 19/00* (2006.01)
(52) U.S. Cl. .................. 704/230; 704/500; 704/501
(58) Field of Classification Search ................ None
See application file for complete search history.

(56) References Cited

U.S. PATENT DOCUMENTS 5,502,491 A * 3/1996 Sugiyama et al. ........ 375/240.2
5,675,385 A    10/1997 Sugiyama
6,249,546 B1 * 6/2001 Bist .................... 375/240.03
6,603,813 B1 * 8/2003 Sriram et al. ......... 375/240.03

FOREIGN PATENT DOCUMENTS

| EP | 0 946 062 A2 | 9/1999 |
|---|---|---|
| JP | 2-502491 | 8/1990 |
| JP | 2-288739 | 11/1990 |
| JP | 3-35299 | 2/1991 |
| JP | 8-263099 | 10/1996 |
| JP | 2001-142493 | 5/2001 |

* cited by examiner

*Primary Examiner*—Richemond Dorvil
*Assistant Examiner*—Leonard Saint Cyr
(74) *Attorney, Agent, or Firm*—Oblon, Spivak, McClelland, Maier & Neustadt, P.C.

(57) ABSTRACT

The present invention intends to render quantization noise virtually imperceptible for a user and to prevent reduction in frequency resolution and reduction in encoding efficiency.

A signal encoding apparatus includes: a quantization unit for quantizing an input signal based on a plurality of quantization methods; a dequantization unit for obtaining decoded signals by performing the dequantizing process; an error signal calculation unit for calculating a plurality of error signals between the decoded signals and the input signal; a weighting calculation unit for calculating, for each subblock, a weight related to degree concerning whether or not quantization noise corresponding to error signal is virtually imperceptible for a user; a quantization method selection unit for selecting a given quantization method from among the plurality of quantization methods, when a plurality of weighted error signals, obtained by assigning a weight of each subblock to an error signal of the subblock, are generated, based on the of weighted error signals; and an output unit for outputting the input signal quantized based on the given quantization method as an output signal.

32 Claims, 8 Drawing Sheets

SIGNAL ENCODING APPARATUS, SIGNAL ENCODING METHOD, AND PROGRAM

TECHNICAL FIELD

The present invention relates to a signal encoding apparatus, and a signal encoding method, for performing a quantizing process of an input signal. More specifically, the present invention relates to a signal encoding apparatus, a signal encoding method, and a program, for performing processing in relation to quantization noise included in a signal.

BACKGROUND ART

Generally, there have been numerous methods and apparatuses for efficiently compressing and encoding sound signals and/or image signals so far. Typical encoding methods for sound signals include a method using the MPEG-2 Audio standardized by ISO/IEC, for example. Moreover, typical encoding methods for image signals include a method using the MPEG-4 Visual standardized by ISO/IEC and a method using the ITU-T Recommendation H.263.

The encoding process of various input signals is made possible by use of these encoding methods. A model aiming at encoding a specific input signal (such as the CELP which is a basic algorithm of voice encoding) is not used in these encoding methods. Moreover, in these encoding methods, a time domain signal (or a space domain signal) is transformed into a frequency domain signal for each block, and then the encoding process is performed. By this transforming process, temporal redundancy existing in the input signal is localized in the frequency domain. As a result, encoding efficiency is enhanced in the encoding process of the input signal.

Meanwhile, it is generally said that human auditory characteristics and human visual characteristics depend on frequency. For this reason, transformation of a time domain signal into a frequency domain signal as described above is convenient in terms of the following point. The point is that such an encoding process is performed in consideration of the human visual characteristics and the human auditory characteristics.

Methods for transforming a time domain signal (or a space domain signal) into a frequency domain signal include a Fourier transform method, a discrete cosine transform (DCT conversion) method, a modified discrete cosine transform (MDCT conversion) method, and a wavelet transform (WT conversion) method, for example.

Here, in the DCT coding method (or in the MDCT coding method), a time domain input signal is firstly transformed into a transformed signal which is a frequency domain signal. Then, the transformed signal is subjected to a quantizing process. In this quantizing process, a predetermined weighting is applied to a DCT coefficient (or an MDCT coefficient) based on an auditory psychological model (a model derived based on the human auditory characteristics) and on amplitude characteristics (amplitude characteristics of a frequency domain input signal). By this weighting process, it is possible to control quantization noise included in a decoded signal to an extent of being virtually imperceptible for a user. In this event, in case of DCT (or in case of MDCT), the transforming process of the input signal is performed for each of certain blocks. For this reason, a fixed weight is assigned to the DCT coefficient (or the MDCT coefficient) for each of certain blocks.

However, the above-described prior art has had the following problems. When a length of each of certain blocks is equal to or longer than a predetermined length, characteristics of an input voice signal corresponding to the certain block often vary one after another in each of consecutive short time periods. For example, in the change of time, a portion where a voice input signal sharply rises and a portion where the voice input signal does not change exist in the certain block (in the input voice signal corresponding to the block). In this respect, heretofore, the fixed weighting process corresponding to the length of the certain block has been performed. In this weighting process, characteristics concerning these portions existing in the block are not considered. For this reason, heretofore, it has not been deemed possible to control the quantization noise (the quantization noise caused by error signals) to an extent of being virtually imperceptible for the user.

Meanwhile, in case of DCT (or in case of MDCT), there is also a technique of performing the transforming process for each of certain short blocks of the input signal. In this technique, a fixed weight is assigned to the DCT coefficient or the MDCT coefficient for each of the certain short blocks.

According to this technique, even when the characteristics of the input voice signal vary with the consecutive short time periods, it is possible to perform the weighting process which corresponds to the characteristics of the input voice signal. By this weighting process, it is possible to control the quantization noise to an extent of being virtually imperceptible for the user.

However, when the transforming process of the input signal is performed for each of certain short blocks, there are the following problems. In this case, frequency resolution of the input signal is reduced because an interval of observation of the input signal is shortened. Moreover, supplementary information for decoding a signal obtained by encoding the input signal (such as information indicating a quantization width necessary for decoding the input signal) is required for every short block. Accordingly, encoding efficiency of the input signal is reduced.

Therefore, development of a signal encoding apparatus has been awaited which is capable of controlling the quantization noise to an extent of being virtually imperceptible for the user even when the characteristics of the input signal vary with the consecutive short time periods, and of preventing reduction in the frequency resolution and reduction in the encoding efficiency.

An object of the present invention is to provide a signal encoding apparatus, a signal encoding method, and a program, which are capable of controlling the quantization noise to an extent of being fully imperceptible for the user even when the characteristics of the input signal vary with the consecutive short time periods, and of preventing reduction in the frequency resolution and reduction in the encoding efficiency.

DISCLOSURE OF THE INVENTION

To attain the object, the present invention, when performing quantization of an input signal, then encoding the input signal quantized, and then outputting the input signal encoded as an output signal, is characterized in that: the input signal of a predetermined block is quantized based on a plurality of quantization methods; a plurality of decoded signals are obtained by respectively dequantizing a plurality of quantized signals; a plurality of error signals of the predetermined block, each of which indicates a difference between each of the plurality of decoded signals and the input signal, are calculated; a weight related to degree concerning whether or not quantization noise corresponding to an error signal of a short block which is shorter block than the predetermined block is virtually imperceptible for a user is calculated for each of short blocks included in the predetermined block; when a plurality of first weighted error signals, each of which indicates a signal obtained by assigning a weight, corresponding to each short block included in the predetermined block, to an error signal of the short block, are generated, the plurality of weighted error signals are to compared with one another, and a given quantization method is selected from among the plurality of quantization methods based on a result of the comparison; and, when the input signal of the predetermined block is quantized based on the given quantization method and then the quantized input signal is encoded, the encoded input signal is outputted as an output signal.

The invention is characterized in that: the calculation of weight is performed by calculating a weight related to degree concerning whether or not quantization noise corresponding to an error signal of each of subblocks into which the predetermined block is divided is virtually imperceptible for the user, for each subblock included in the predetermined block; the selection of quantization method, when a plurality (number of error signals corresponding to the predetermined block) of first weighted error signals (weighted error signals corresponding to the predetermined block), each of which indicates a signal obtained by assigning a weight, corresponding to each subblock included in the predetermined block, to an error signal of the subblock, are generated, is performed by comparing the plurality of first weighted error signals with one another, and then selecting a given quantization method from among the plurality of the quantization methods based on a result of the comparison.

According to the present invention, when the quantization process and the encoding process are performed for each predetermined block having the relatively long block length (such as the one block as described above), for example, reduction in the frequency resolution of the input signal and reduction in the encoding efficiency of the input signal are prevented.

Moreover, in the present invention, a weight related to degree concerning whether or not quantization noise corresponding to an error signal of a short blocks (such as the subblock) which is shorter block than the predetermined block, is virtually imperceptible for the user, is calculated for each short block included in the predetermined block.

Furthermore, in the present invention, the quantization of the input signal of the predetermined block is performed based on each of the plurality of quantization methods. For this reason, the respective decoded signals obtained by the dequantizing process are linked with the respective quantization methods. As a result, it is possible to say that the respective error signals thus calculated are also linked with the respective quantization methods.

In the present invention, when the plurality of first weighted error signals (the weighted error signals corresponding to the predetermined block), each of which indicates a signal obtained by assigning a weight, corresponding to each short block included in the predetermined block to an error signal of each short block, are generated, the following processing is performed.

In the present invention, the plurality of first weighted error signals are compared with one another, and a given weighted error signal is selected based on a result of the comparison. It is possible to say that the given weighted error signal is linked with a given quantization method. Accordingly, selection of the given weighted error signal corresponds to selection of the given quantization method.

Meanwhile, the weighted error signal is the error signal provided with a weight related to degree concerning whether or not quantization noise is virtually imperceptible for the user. When the weighting process is performed by use of the weight, it is possible to control the quantization noise as described below, for example. Specifically, by the weighting process, it is possible to control the quantization noise in a way that larger quantization noise is given to frequency domain having larger signal value of the input signal corresponding to each subblock, and in a way that small quantization noise is given to frequency domain having small signal value of the input signal corresponding to each subblock. By performing the weighting process on all the subblocks included in the predetermined block, it is possible to control the quantization noise to an extent of being virtually imperceptible for the user. For this reason, it is possible to say that the given quantization method thus selected is the quantization method which can render the quantization noise virtually imperceptible for the user.

Therefore, according to the present invention, the given quantization method (the quantization method which renders the quantization noise virtually imperceptible for the user) is selected from among the plurality of quantization methods.

For example, in the present invention, a weight related to degree concerning whether or not quantization noise corresponding to an error signal of the subblock is virtually imperceptible for the user, is calculated for each of the subblocks included in the predetermined block. For this reason, even when frequency characteristics of the input signal vary to a large extent among the respective subblocks included in the predetermined block, the following weight is calculated for each of the subblocks in the present invention. Specifically, the weight related to degree concerning whether or not quantization noise corresponding to an error signal of each subblock is virtually imperceptible for the user, is calculated.

Moreover, in the present invention, the predetermined block (e.g., one block) is divided into subblocks (subblocks 1 to 4). A weight corresponding to each subblock (e.g., one of weighted filters W1 to W4) is assigned to an error signal of each subblock. This generates first weighted error signals (weighted error signals of the one block) in plural number (a plurality of error signals 1, 2, 3, . . . of the one block).

For this reason, a weight related to degree concerning whether or not quantization noise corresponding to an error signal of each subblock is virtually imperceptible for the user is assigned to each of the first weighted error signals. As a result, it is possible to say that the given quantization method thus selected is a quantization method which renders quantization noise corresponding to an error signal of each subblock virtually imperceptible for the user.

According to the present invention, therefore, the quantization method (the quantization method which renders the quantization noise corresponding to an error signal of each subblock virtually imperceptible for the user) is selected from among the plurality of quantization methods.

By performing the quantizing process based on the quantization method thus selected, the following effects are obtained even when characteristics of the input signal vary with consecutive short time periods. Specifically, the user cannot fully perceive quantization noise included in the decoded signals. Moreover, reduction in the frequency resolution and reduction in the encoding efficiency are prevented. As a result, it is possible to improve subjective quality of voice signals and sound signals.

Meanwhile, the invention is characterized in that electric power values of the plurality of first weighted error signals are respectively calculated. Moreover, the invention is characterized in that the selection of a given quantization method is performed by comparing the electric power values of the plurality of first weighted error signals with one another and then by selecting a given quantization method from among the plurality of the quantization methods based on a result of the comparison.

Meanwhile, the invention is characterized in that once a predetermined quantization method is selected, a unit (e.g. a quantization unit 5) configured to perform the quantization, is instructed not to perform quantization based on any quantization method other than the predetermined quantization method.

Meanwhile, the invention is characterized in that the plurality of quantization methods are generated based on an amount of information of encoding terms necessary for expressing the output signal to be outputted.

Meanwhile, the invention is characterized in that the calculation of the weight is performed by calculating linear prediction parameters by performing a linear prediction analysis of the input signal for each of the subblocks, and then generating for each subblock, a weight related to degree concerning whether or not quantization noise corresponding to an error signal of the subblock is virtually imperceptible for the user, based on the linear prediction parameters thus calculated.

Meanwhile, in the invention, the following processing is performed instead of the calculation of weight which performs the calculating process for each of the subblocks included in the predetermined block. The present invention calculates linear prediction parameters by performing a linear prediction analysis of the input signal for each of the subblocks, then calculates based on the linear prediction parameters calculated for each of the subblocks, an average of the linear prediction parameters for each subblock, then calculates weighting linear prediction parameters corresponding to the predetermined block, based on the average of linear prediction parameters calculated for each of the subblocks, and generates a weight related to degree concerning whether or not quantization noise corresponding to an error signal of the predetermined block is imperceptible for the user, based on the weighting linear prediction parameters corresponding to the predetermined block.

Meanwhile, in the invention, the following processing is performed instead of the processing for generating the plurality of first weighted error signals and selecting the given quantization method. When a plurality (number of the error signals of the predetermined block) of second weighted error signals, each of which indicates a signal obtained by assigning the weight generated to an error signal of the predetermined block, are generated, the present invention compares the plurality of second weighted error signals with one another, and selects the given quantization method from among the plurality of quantization methods based on a result of the comparison.

Meanwhile, the invention is characterized in that the calculation of weight is performed by subjecting the input signal to linear transformation into a transformed signal for each of the subblocks, then generating, for each of the subblocks, a weight related to degree concerning whether or not quantization noise corresponding to an error signal of the subblock is virtually imperceptible for the user, based on the transformed signal of each subblock, and then performing inverse linear transformation of each weight thus generated.

Meanwhile, in the invention, the following processing is performed instead of the weighting calculation for performing the calculating process for each of the subblocks included in the predetermined block. The present invention subjects the input signal to linear transformation into a transformed signal for each of the subblocks, then calculates, based on transformed signal values which are values of each transformed signal subjected to the linear transformation, transformation average values corresponding to the predetermined block, each indicating an average of the transformed signal values, then generates a weight related to degree concerning whether or not quantization noise corresponding to an error signal of the predetermined block is virtually imperceptible for the user, based on the transformation average values corresponding to the predetermined block, and then performs the inverse linear transformation of the generated weight. Moreover, in the invention, the following processing is performed instead of the processing for generating the plurality of first weighted error signals and selecting the given quantization method. When a plurality of second weighted error signals, each of which indicates a signal obtained by assigning the weight inversely transformed by the inverse transformer, to an error signal of the predetermined block, are generated, the present invention compares the plurality of second weighted error signals with one another, and selects a given quantization method from among the plurality of quantization methods based on a result of the comparison.

Meanwhile, the invention is characterized in that the calculation of weight is performed by calculating a signal electric power value indicating an electric power value of the input signal for each of the subblocks, and generating, for each of the subblocks, a weight related to degree concerning whether or not quantization noise corresponding to an error signal of the subblock is virtually imperceptible for the user, based on the signal electric power value corresponding to each subblock.

Meanwhile, in the invention, the following processing is performed instead of the weighting calculation for performing the calculation process for each of the subblocks included in the predetermined block. The present invention calculates a signal electric power value indicating an electric power value of the input signal for each of the subblocks, then calculates, based on respective signal electric power values thus calculated, an electric power function corresponding to the predetermined block indicating distribution of the respective signal electric power values, and generates a weight related to degree concerning whether or not quantization noise corresponding to an error signal of the predetermined block is virtually imperceptible for the user, based on the calculated electric power function. In the invention, the following processing is performed instead of the processing for generating the plurality of first weighted error signals and selecting the given quantization method. When a plurality of second weighted error signals, each of which indicates a signal obtained by assigning the weight to an error signal of the predetermined block, are generated, the present invention compares the plurality of second weighted error signals with one another, and selects a given quantization method from among the plurality of quantization methods based on a result of the comparison.

Meanwhile, a program of the present invention can be recorded on a computer-readable recording medium. The present invention is a computer-readable recording medium recording a program for performing quantization of an input signal, for encoding the quantized input signal, and then for outputting the encoded input signal as an output signal, the program causing a computer to execute processing comprising: a quantization step of quantizing the input signal of a predetermined block based on a plurality of quantization methods; a step of obtaining a plurality of decoded signals by respectively dequantizing a plurality of quantized signals; a step of calculating a plurality of error signals of the predetermined block, each of which indicates a difference between each of the plurality of decoded signals and the input signal; a weight calculation step of calculating, a weight related to degree concerning whether or not quantization noise corresponding to an error signal of a short block which is shorter block than the predetermined block is virtually imperceptible for a user for each of short blocks included in the predetermined block; a first selection step, when a plurality of first weighted error signals, each of which indicates a signal obtained by assigning a weight, corresponding to each short block included in the predetermined block, to an error signal of the short block, are generated, to compare the plurality of first weighted error signals with one another, and to select a given quantization method from among the plurality of quantization methods based on a result of the comparison; and a step, when the input signal of the predetermined block is quantized based on the given quantization method and then the input signal quantized is encoded, of outputting the input signal encoded as an output signal.

Meanwhile, the present invention is above-described computer-readable recording medium recording above-described program, wherein the weight calculation step comprises a step of calculating, a weight related to degree concerning whether or not quantization noise corresponding to an error signal of each of subblocks into which the predetermined block is divided is virtually imperceptible for the user, for each subblock included in the predetermined block, and wherein, when a plurality of first weighted error signals, each of which indicates a signal obtained by assigning a weight, corresponding to each subblock included in the predetermined block, to an error signal of the subblock, are generated, the first selection step comprises a step of comparing the plurality of first weighted error signals with one another, and selects a given quantization method from among the plurality of the quantization methods based on a result of the comparison.

Meanwhile, the present invention is above-described computer-readable recording medium recording above-described program, the program causing the computer to execute processing further comprising a step of calculating electric power values of the plurality of first weighted error signals respectively, and wherein the first selection step comprises a step of comparing the electric power values of the plurality of first weighted error signals with one another, and of selecting a given quantization method from among the plurality of the quantization methods based on a result of the comparison.

Meanwhile, the present invention is above-described computer-readable recording medium recording above-described program, wherein the program causes the computer to execute processing further comprising a step of instructing a unit configured to perform the quantization step so as not to perform quantization based on any quantization method other than a predetermined quantization method, when the predetermined quantization method is selected in the first selection step.

Meanwhile, the present invention is above-described computer-readable recording medium recording above-described program, the program causing the computer to execute processing further comprising a step of generating the plurality of quantization methods based on an amount of information of encoding terms necessary for expressing the output signal to be outputted.

Meanwhile, the present invention is above-described computer-readable recording medium recording above-described program, wherein the weight calculation step comprises: a step of calculating linear prediction parameters by performing a linear prediction analysis of the input signal for each of the subblocks in the predetermined block; and a step of generating, for each subblock, a weight related to degree concerning whether or not quantization noise corresponding to an error signal of the subblock is virtually imperceptible for the user, based on the linear prediction parameters thus calculated.

Meanwhile, the present invention is above-described computer-readable recording medium recording above-described program, the program causing the computer to execute processing comprising, instead of the weight calculation step: a step of calculating linear prediction parameters by performing a linear prediction analysis of the input signal for each of the subblocks; a step of calculating, based on the linear prediction parameters calculated for each of the subblocks, an average of the linear prediction parameters for each subblock; a step of calculating weighting linear prediction parameters corresponding to the predetermined block, based on the average of the linear prediction parameters calculated for each subblock; and a generation step of generating a weight related to degree concerning whether or not quantization noise corresponding to an error signal of the predetermined block is virtually imperceptible for the user, based on the weighting linear prediction parameters corresponding to the predetermined block, and comprising, instead of the first selection step, a step, when a plurality of second weighted error signals, each of which indicates a signal obtained by assigning the weight generated in the generation step, to an error signal of the predetermined block, are generated, of comparing the plurality of second weighted error signals with one another, and of selecting the given quantization method from among the plurality of quantization methods based on a result of the comparison.

Meanwhile, the present invention is above-described computer-readable recording medium recording above-described program, wherein the weight calculation step comprises: a step of subjecting the input signal to linear transformation into a transformed signal for each of the subblock; a step of generating, for each of the subblocks, a weight related to degree concerning whether or not quantization noise corresponding to an error signal of the subblock is virtually imperceptible for the user, based on the transformed signal of each subblock; and a step of performing an inverse linear transformation of each weight thus generated.

Meanwhile, the present invention is above-described computer-readable recording medium recording above-described program, the program causing the computer to execute processing, comprising, instead of the weighting calculation step: a step of subjecting the input signal to linear transformation into a transformed signal for each of the subblocks; a step of calculating, based on transformed signal values which are values of each transformed signal subjected to the linear transformation, transformation average values corresponding to the predetermined block, each indicating an average of the transformed signal values; a step of generating a weight related to degree concerning whether or not quantization noise corresponding to an error signal of the predetermined block is virtually imperceptible for the user, based on the transformation average values corresponding to the predetermined block; and an inverse transformation step of performing inverse linear transformation of the generated weight, and further comprising, instead of the first selection step: a step, when a plurality of second weighted error signals, each of which indicates a signal obtained by assigning the weight inversely transformed by the inverse transformer, to an error signal of the predetermined block, are generated, of comparing the plurality of second weighted error signals with one another, and of selecting a given quantization method from among the plurality of quantization methods based on a result of the comparison.

Meanwhile, the present invention is above-described computer-readable recording medium recording above-described program, wherein the weight calculation step comprises: a step of calculating a signal electric power value indicating an electric power value of the input signal for each of the subblocks; and a step of generating, for each of the subblocks, a weight related to degree concerning whether or not quantization noise corresponding to an error signal of the subblock is virtually imperceptible for the user, based on the signal electric power value corresponding to each subblock.

Meanwhile, the present invention is above-described computer-readable recording medium recording above-described program, the program causing the computer to execute processing comprising, instead of the weighting calculation step: a step of calculating a signal electric power value indicating an electric power value of the input signal for each of the subblocks; a step of calculating an electric power function indicating distribution of the signal electric power values corresponding to the predetermined block based on the respective signal electric power values thus calculated; and a generation step of generating a weight related to a degree concerning whether or not the quantization noise corresponding to the error signal of the predetermined block is virtually imperceptible for the user, based on the calculated electric power function, and processing further comprising, instead of the first selection step: a step, when a plurality of second weighted error signals indicating signals obtained by assigning the weights, generated in the generation step, to the error signals of the predetermined bloc are generated, of comparing the plurality of second weighted error signals with one another, and of selecting the predetermined quantization method from the plurality of quantization methods based on a result of the comparison.

BEST MODES FOR CARRYING OUT THE INVENTION

A signal encoding apparatus and a signal encoding method according to the present invention will be described below in detail with reference to the drawings showing embodiments thereof.

EMBODIMENT 1

Figure 1:
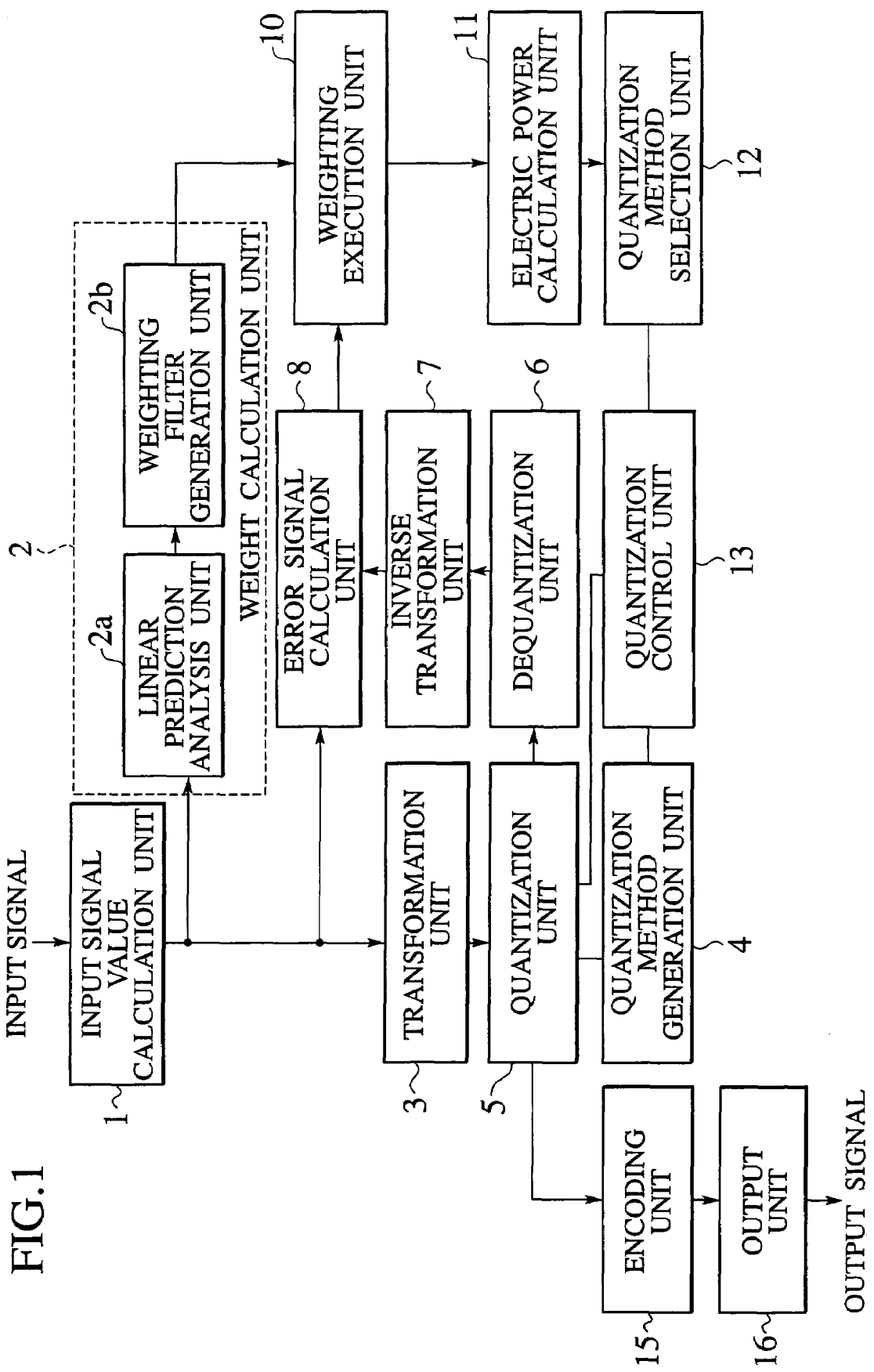
FIG. 1 is a view showing a configuration of a signal encoding apparatus in an embodiment 1.
Figure 2:
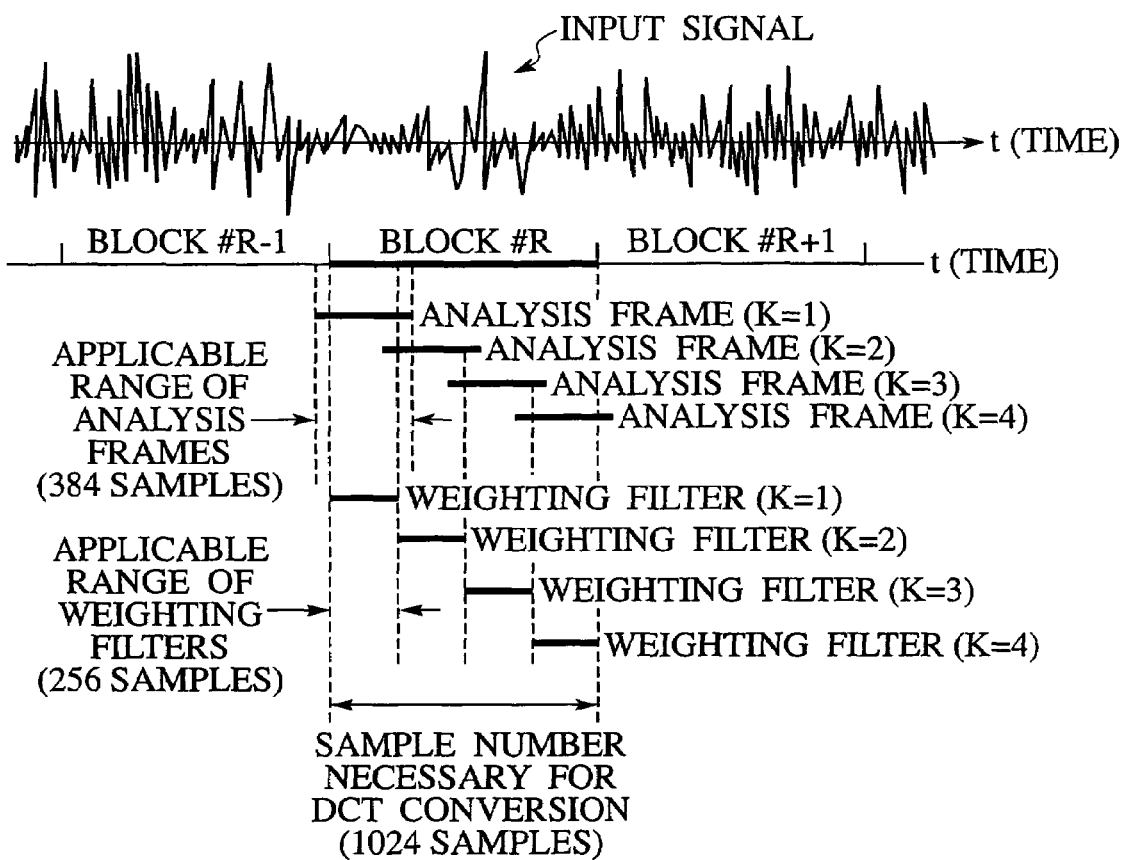
FIG. 2 is a view showing applicable ranges of analysis frames and applicable ranges of weighting filters.

FIG. 1 is a view showing a configuration of a signal encoding apparatus according to an embodiment 1. FIG. 2 is a view showing applicable ranges of analysis frames corresponding to an input signal (applicable ranges in a time domain) and applicable ranges of weighting filters corresponding to the input signal (applicable ranges in the time domain). Note that the analysis frame and the weighting filter will be described later.

A signal encoding apparatus includes an input unit (not shown) to which various data (such as the input signal) are inputted, and an input signal value calculation unit 1 for calculating a signal value of the input signal for each predetermined block based on the input signal inputted to the input unit. The block is defined as follows, for example. The input signal is divided into a plurality of blocks for each predetermined time interval, for example. An input signal corresponding to a predetermined time is the block. The predetermined block may be one block or two blocks. Explanation will be made on the case where the predetermined block is one block as an example.

The input signal value calculation unit 1 calculates based on an inputted input signal, a signal value of the input signal for each discrete time. The discrete time is defined as follows, for example. In terms of discrete times t1, t2, t3, and so on, a time interval between a time tn (n is an integer) and a time tn+1 constitutes a constant time period. For example, a time interval between the time t1 and the time t2 is equal to a time interval between the time t2 and the time t3.

For example, when a predetermined time T corresponding to one block is equivalent to 1024 intervals, each of which indicates interval between the discrete times (an interval between discrete times will be hereinafter referred to as a sample), the input signal value calculation unit 1 calculates a signal value f(n) of the input signal corresponding to one block form (sample code). In this embodiment, a plurality (such as 1024 pieces) of signal values of the input signal corresponding to one block will be hereinafter simply referred to as the input signal of one block. Moreover, sample number equivalent to the predetermined time T corresponding to one block will be referred to as sample number of one block (such as 1024 pieces). Furthermore, each sample code included in the predetermined time T corresponding to one block will be referred to as each sample code corresponding to one block. Meanwhile, an input signal corresponding to one block is equivalent to an input signal existing in the predetermined time T corresponding to one block. Moreover, a transformed signal corresponding to one block is equivalent to an input signal corresponding to one block, the input signal being transformed by a transformation unit 3. These definitions will also apply to the analysis frame and a subblock (divided block, as described later).

Meanwhile, the signal encoding apparatus includes the transformation unit 3 for performing linear transformation (such as an orthogonal transforming process) of the input signal for one block calculated by the input signal value calculation unit 1, a quantization method generation unit 4 for generating a plurality of quantization methods, a quantization unit 5 for quantizing a transformed signal being an input signal for one block subjected to the linear transformation by the transformation unit 3 based on each of the quantization methods, a dequantization unit 6 for dequantizing a plurality of quantized signals quantized by the quantization unit 5, an inverse transformation unit 7 for performing inverse linear transformation of a plurality of transformed signals outputted from the dequantization unit 6, and an error signal calculation unit 8 for calculating a plurality of error signals for one block, each of which indicates a differential signal between each of a plurality of decoded signals outputted from the inverse transformation unit 7 and the input signal outputted from the input signal value calculation unit 1.

The transformation unit 3 transforms the input signal into a transformed signal by performing the linear transformation of the input signal. The linear transformation is an orthogonal transformation, for example. Here, description will be made by use of the DCT as an example. Note that the transformation unit 3 can also perform linear transformation other than the orthogonal transformation. When the input signal value is defined as x(n), an signal value X(m) of the transformed signal can be expressed by the following formula:

$$X(m) = \sqrt{\frac{2}{N}} \, C(m) \sum_{n=0}^{N-1} x(n)\cos\left[\frac{(2n+1)m\pi}{2N}\right] \quad \text{[Formula 1]}$$

which $C(m)=(1/2)^{1/2}(m=0), 1(m=1,2,\ldots,N-1)$. Moreover, N is the sample number of one block.

The transformation unit 3 transforms the input signal into a transformed signal by performing the transforming process of the input signal for one block. In the following, when the transformation unit 3 performs transformation of the input signal for one block, the input signal for one block thus transformed will be referred to as the transformed signal for one block. In addition, by this process, a signal in the time domain (the input signal) is transformed into a signal in a frequency domain (the transformed signal).

The quantization method generation unit 4 generates the plurality of quantization methods based on frequency characteristics of the transformed signal, for example. In this case, discrete intervals (quantization widths, to be more precise) linked with the respective quantization methods are different from one another. For example, a discrete interval of the transformed signal quantized by a quantization method 1 and a discrete interval of the transformed signal quantized by a quantization method 2 are mutually different.

In this way, the quantization method generation unit 4 can generate the plurality of quantization methods as follows. When the transformed signal is quantized based on each of the plurality of quantization methods, in terms of the transformed signal for one block, relatively large quantization noise is given to a range of the transformed signal having a high signal value, and relatively small quantization noise is given to a range of the transformed signal having a low signal value.

In this event, the quantization method generation unit 4 generates the plurality of quantization methods based on an amount of information of encoding terms necessary for expressing an output signal to be outputted from an output unit 16. To be more precise, the quantization method generation unit 4 generates the plurality of quantization methods so that the amount of information of the encoding terms necessary for expressing the output signal remains within a certain amount. That is to say, the quantization method generation unit 4 generates the plurality of quantization methods so that each of the discrete intervals related to the quantization methods reaches a certain value or above. When generating the plurality of quantization methods, the quantization method generation unit 4 retains the plurality of quantization methods. Here, the above-described generating process of the quantization methods is merely an example. In the present invention, a concrete mode of the generating process by the quantization method generation unit 4 is not particularly limited.

The quantization unit 5 quantizes the transformed signal for one block based on the quantization method generated by the quantization method generation unit 4. When there are a plurality of quantization methods corresponding to the transformed signal for one block, the quantization unit 5 performs the following processing. The quantization unit 5 quantizes the transformed signal for one block severally based on the respective quantization methods. In this case, the quantization unit 5 performs the quantizing process of the transformed signal of the same block for multiple times. Concrete explanation of the methods of the quantizing process will be described later.

A quantized signal indicating each of the transformed signals (here, the transformed signal is frequency domain signal) quantized by the quantization unit 5 is linked with each of the quantization methods.

The dequantization unit 6 dequantizes a plurality of quantized signals which are quantized by the quantization unit 5. Then, the dequantization unit 6 outputs the plurality of quantized signals thus dequantized to the inverse transformation unit 7 as a plurality of dequantized signals.

The inverse transformation unit 7 performs inverse transformation of the plurality of dequantized signals. Then, the inverse transformation unit 7 obtains the respective dequantized signals subjected to the inverse transformation respectively as decoded signals. Thereafter, the inverse transformation unit 7 outputs the respective decoded signals to the error signal calculation unit 8. The respective decoded signals are the time domain signals.

For example, when the transforming process performed by the transformation unit 3 is the DCT process, the inverse transformation to be performed by the inverse transformation unit 7 is the inverse DCT. In this case, a decoded signal x1(n) can be expressed as follows:

$$x1(n) = \sqrt{\frac{2}{N}} \sum_{m=0}^{N-1} C(m)X(m)\cos\left[\frac{(2n+1)m\pi}{2N}\right] \quad \text{[Formula 2]}$$

where X(m) is the transformed signal. Meanwhile, the value of C(m) will be defined as follows:

$C(m)=(1/2)^{1/2}(m=0),1(m=1,2,\ldots,N-1)$

The error signal calculation unit 8 calculates a plurality of error signals for one block, each of which indicates a differential signal between the input signal and each of the plurality of decoded signals. In this case, the error signal calculation unit 8 calculates an error signal value (a signal value in the time domain) for each sample code corresponding to one block. The error signal values of the respective sample codes corresponding to one block will be simply referred to as the error signals for one block. The calculated error signal values are linked with the quantization methods.

The signal encoding apparatus includes a weight calculation unit 2. The weight calculation unit 2 calculates a weight related to degree concerning whether or not quantization noise corresponding to an error signal of each of subblocks (divided blocks), into which one block is divided, is virtually imperceptible for a user, for each of the subblocks, based on the input signal for one block which is calculated by the input signal value calculation unit 1.

The weight calculation unit 2 includes a linear prediction analysis unit 2a and a weighting filter generation unit 2b. The linear prediction analysis unit 2a performs a linear prediction analysis of an input signal for each analysis frame, based on signal value (f(n)) of an input signal corresponding to the analysis frame (such as a block corresponding to 384 samples) which is a shorter block than the one block (such as a block corresponding to 1024 samples).

In the meantime, the analysis frame corresponds to the subblock. For this reason, it is possible to say that "the linear prediction analysis unit 2a performs the linear prediction analyzing process for each analysis frame" corresponds to "the linear prediction analysis unit 2a performs linear prediction analyzing process for each of the subblocks." Similarly, it is possible to say that "each unit performs a process for each analysis frame" corresponds to "each unit performs a process for each of the subblocks."

In this event, as shown in FIG. 2, an overlapping portion (an overlapping portion of the sample numbers) may be provided between the analysis frames (between an analysis frame for k=1 and an analysis frame for k=2, for example). Linear prediction coefficients (hereinafter referred to as prediction coefficients) are calculated for each analysis frame by the processing of this linear prediction analysis unit 2a. In this event, the linear prediction analysis unit 2a may perform an interpolating process of prediction coefficient in order to calculate a plurality of prediction coefficients.

The linear prediction analysis unit 2a can also generate a spectral envelope model of the input signal, for example, by use of the prediction coefficients obtained by the linear prediction analysis. Moreover, the linear prediction analysis unit 2a can calculate one or more parameters indicating the spectral envelope based on the generated model. Note that each of the linear prediction coefficient and LSP will be referred to as linear prediction parameter in this specification.

Concrete explanation is as follows. The input signal corresponding to a time t, applicable ranges of the respective blocks, applicable ranges of the respective analysis frames (k=1 to 4), applicable ranges of respective weighting filters (k=1 to 4), and a time range (the sample number) necessary for the DCT are shown in FIG. 2.

As shown in FIG. 2, four analysis frames (k=1 to 4) correspond to an R-th block. In this case, the linear prediction analysis unit 2a calculates a linear prediction model using a prediction coefficient αki (in which k is a suffix indicating the number of an analysis frame, i=1 to M, and M is an order of the linear prediction analysis) for each analysis frame, for example. Since a mode of calculating the linear prediction model is a publicly-known technique of the linear prediction analysis, description will be omitted herein.

The linear prediction analysis unit 2a calculates a square sum of an error between a predicted value derived from the linear prediction model and each signal value of the input signal (each signal value f(n) of an input signal corresponding to a certain analysis frame, n=1 to 384, for example). Then, the linear prediction analysis unit 2a calculates the prediction coefficient αki which renders the calculated square sum minimum.

The weighting filter generation unit 2b generates a weighting filter by use of the prediction coefficient αki calculated by the linear prediction analysis unit 2a. Concrete explanation of this generating process is as follows.

The weighting filter generation unit 2b performs the following generating process based on the frequency characteristics of the input signal. The weighting filter generation unit 2b calculates a weight which increases quantization noise in a frequency domain having a large signal value of the input signal and decreases quantization noise in a frequency domain having a small signal value of the input signal. It is to be noted, however, that the magnitude of the quantization noise is set within a predetermined value in the frequency domain having the large signal value of the input signal. The weighting filter generation unit 2b generates the weighting filter based on the calculated weight. A formula showing an example of a transfer function (a formula for z transformation display) of the weighting filter thus generated is defined as follows:

$$W_k(Z) = \frac{1 + \sum_{i=1}^{M} \alpha_{ki} \gamma_{nk}^i Z^{-i}}{1 + \sum_{i=1}^{M} \alpha_{ki} \gamma_{dk}^i Z^{-i}}$$ [Formula 3]

where γdk and γnk are constants which satisfy a relation of 0<γdk<γnk<1. This weighting filter is a publicly-known formant weighting filter (a publicly-known perceptual weighting filter). The formant weighting filter is described in a document concerning a devisal by Atal (B. S. Atal and M. R. Schroeder, Predictive Codling of Speech Signals and Subjective Error Criteria, IEEE Trans Account. Speech Signal Processing vol. ASSP-27, pp 247-254 1979).

Meanwhile, a formula showing an example of another perceptual weighting filter is defined as follows:

$$W_k(Z) = 1 + \sum_{i=1}^{M} \alpha_{ki} \gamma_k^i Z^{-i}$$ [Formula 4]

where γk is a constant which satisfies a relation of 0<γk<1.

In the explanation above, the weight calculation unit 2 performs the linear prediction analysis for each analysis frame and generates the weighting filter for each of the subblocks. The weighting filter is applied to a signal value of an error signal of each sample code corresponding to each subblock. The signal value of the error signal of each sample code corresponding to each subblock will be hereinafter simply referred to as the error signal of the subblock. Incidentally, when the sample number of one block is equal to 1024 and the one block is divided into four subblocks, the sample number of each of the subblocks is equal to 256.

Note that a technique for determining the analysis frames is not particularly limited in this embodiment. Normally, the analysis frames are determined such that the sample number of each of the analysis frames is slightly greater than the sample number of each of the subblocks. According to this determination method, there are overlapping portions between the adjacent frames. Therefore, results of the linear prediction analyses maintain continuity thereof.

Figure 3:
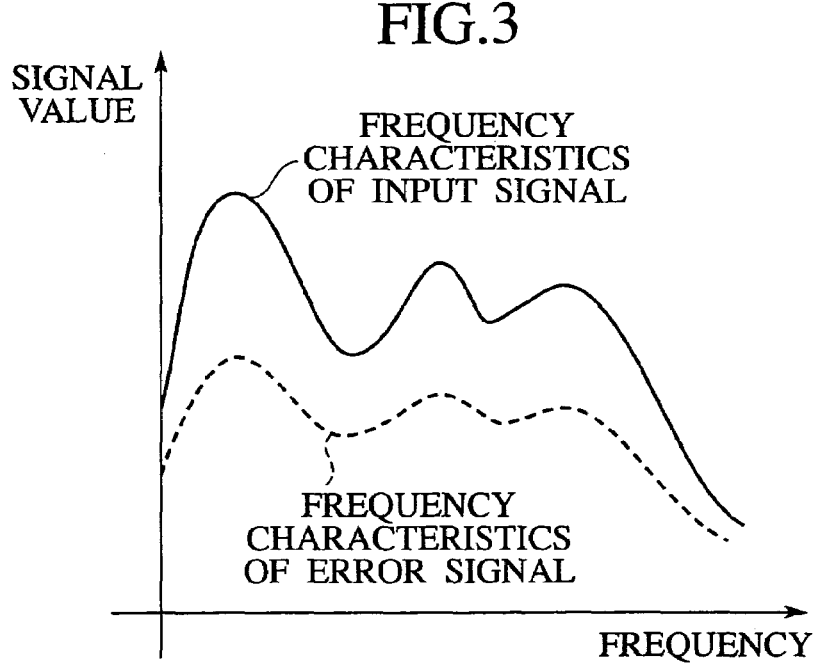
FIG. 3 is a graph showing frequency characteristics of respective signals when the weighting filter is applied to error signals.

When the above-described error signal is subjected to the weighting process by use of this weighting filter, the frequency characteristics of the error signal of the subblock can be controlled as shown in FIG. 3, for example. Here, it is possible to say that the error signal corresponds to quantization noise. For this reason, when the above-described error signal is subjected to the weighting process by use of the weighting filter, it is possible to control the quantization noise as follows.

The quantization noise is made controllable in a way that large quantization noise is given to frequency domain having large signal value of the input signal corresponding to each subblock and small quantization noise is given to frequency domain having small signal value of the input signal corresponding to each subblock.

Moreover, the signal encoding apparatus includes a weighting execution unit 10, an electric power calculation unit 11 for calculating the respective electric power values of a plurality of weighted error signals, a quantization method selection unit 12 for selecting a given quantization method from among the plurality of quantization methods based on the respective electric power values thus calculated, and a quantization control unit 13 for performing various processes concerning the quantization. The quantization control unit 13 performs processing for instructing the quantization unit 5 to stop the quantizing process, and processing for transmitting information concerning the given quantization method to the quantization method generation unit 4, for example.

The weighting execution unit 10 provides error signal of each one block with the weighting process by use of the weighting filters calculated by the weight calculation unit 2. That is to say, the weighting execution unit 10 generates a weighted error signal (a weighted error signal in one block) indicating a signal obtained by providing an error signal of each subblock (each of short blocks) included in one block (a predetermined block) with a weight corresponding the subblock, for an error signal of each one block.

To be more precise, the weighting execution unit 10 provides signal values of error signals of respective subblocks included in one block with the weighting process by use of the weighting filters.

For example, the weighting execution unit 10 provides each signal value of the error signal of the subblock (k=1) shown in FIG. 2 with a predetermined weighting process (a weighting process by use of a weighting filter W1(Z) corresponding to the subblock). Note that W1(Z) is a filter transfer function. Here, the weighted error signal is a time domain signal. Similarly, the weighting execution unit 10 also provides signal values of the error signals of respective subblocks of k=2, 3, and 4 with the weighting process by use of weighting filters W2(Z), W3(Z), and W4(Z).

The weighting execution unit 10 generates a weighted error signal for one block by combining the error signals of the respective subblocks (k=1 to 4) to which respective weights are assigned.

When the weighting process is performed, it is possible to control quantization noise as follows. Specifically, it is possible to control the quantization noise in a way that large quantization noise is given to frequency domain having a large signal value of the input signal corresponding to each subblock and small quantization noise is given to frequency domain having small signal value of the input signal corresponding to each subblock. By subjecting all the subblocks included in one block to the process, it is possible to control quantization noise to an extent of being virtually imperceptible for a user.

Thereafter, the weighting execution unit 10 generates a plurality of weighted error signals for one block by subjecting the respective error signals corresponding to the respective quantization methods to the above-described weighting process. Incidentally, the respective weighted error signals are linked with the respective quantization methods.

The electric power calculation unit 11 calculates electric power values of the plurality of weighted error signals outputted from the weighting execution unit 10. This electric power value WE is calculated as follows:

$$WE = \sum_{k=1}^{K} \sum_{n=T_k}^{T_{k+1}-1} |we(n)|^2 \qquad \text{[Formula 5]}$$

where we(n) is a signal value of a weighted error signal. K indicates the number of weighting filters corresponding to one block. Tk indicates a first sample code to which a k-th weighting filter is applied. Moreover, (Tk+1)−1(k=K) indicates a last sample code of respective sample codes corresponding to one block.

That is to say, in the above-described formula, the electric power value is a value indicating a square sum of signal values of weighted error signal. Moreover, the electric power value in the above-described formula is the value corresponding to one block. The electric power value in the above-described formula will be hereinafter referred to as an electric power value of the weighted error signal for one block, alternatively.

Then, the respective electric power values calculated by the electric power calculation unit 11 are linked with the respective quantization methods. Thereafter, the respective electric power values are transmitted to the quantization method selection unit 12.

The quantization method selection unit 12 compares the plurality of electric power values with one another and selects a given quantization method from among the plurality of quantization methods based on a result of the comparison. In this event, it is possible to say that the respective electric power values are linked with the respective weighted error signals. For this reason, it is possible to say that the quantization method selection unit 12 compares the plurality of weighted error signals with one another and selects a given quantization method from among the plurality of quantization methods based on the result of the comparison.

To be more precise, the quantization method selection unit 12 selects a given quantization method from among the plurality of quantization methods based on the respective electric power values which are transmitted and on the quantization methods corresponding to the respective electric power values. For example, the quantization method selection unit 12 retains an electric power value WE1 which is linked with a quantization method 1. Likewise, the quantization method selection unit 12 retains an electric power value WE2 which is linked with a quantization method 2. Moreover, the quantization method selection unit 12 performs the above-described retaining process for each of the transmitted electric power values. In this event, the quantization control unit 13 transmits all the quantization methods to the quantization method selection unit 12. When the quantization method selection unit 12 judges that electric power values corresponding to all the quantization methods have been transmitted, the quantization method selection unit 12 performs the following processing. The quantization method selection unit 12 selects, for example, a quantization method corresponding to the minimum electric power value from among all the quantization methods.

In this embodiment, as described above, a weighting filter related to degree concerning whether or not quantization noise corresponding to an error signal of each subblock is virtually imperceptible for the user is generated for each subblock. Then, the weighting process by use of the weighting filter is provided to an error signal for each subblock. For this reason, making an electric power value of the error signal for one block subjected to the above-described weighting process to a minimum value is equivalent to controlling quantization noise of the input signal for one block to an extent of being virtually imperceptible for the user.

That is to say, when the quantization unit 5 performs the quantizing process based on the quantization method selected by the quantization method selection unit 12, the quantization noise is reduced as described below. Specifically, the quantization noise is reduced such that a large quantization noise is given to frequency domain having large signal value and a small quantization noise is given to frequency domain having small signal value for each of the subblocks included in one block. For this reason, the quantization noise is caused to be virtually imperceptible for the user.

When the transformed signal is transmitted to the quantization unit 5, the quantization control unit 13 instructs the quantization method generation unit 4, for example, to generate a quantization method based on frequency characteristics of the transformed signal. Moreover, when a given quantization method is selected by the quantization method selection unit 12, the quantization control unit 13 reads the given quantization method from the quantization method generation unit 4. Then, the quantization control unit 13 transmits to the quantization unit 5 instruction information indicating an instruction to perform the quantizing process based on the given quantization method and the given quantization method.

Meanwhile, the quantization unit 5 quantizes the transformed signal for one block based on the quantization method selected by the quantization method selection unit 12.

Note that the quantization unit 5 may quantize the transformed signal for one block based on each quantization method. Moreover, the quantization unit 5 may transmit a plurality of quantized signals (the respective transformed signals quantized by the respective quantization methods) to the quantization method generation unit 4 and/or to the quantization control unit 13. Furthermore, the quantization method generation unit 4 and/or the quantization control unit 13 may retain the plurality of quantized signals. In this case, when a given quantization method is selected by the quantization method selection unit 12, the quantization unit 5 does not need to perform the quantizing process again based on the given quantization method. That is to say, the quantization control unit 13 only has to transmit to an encoding unit 15 a quantized signal corresponding to the given quantization method of the plurality of quantized signals which the quantization control unit 13 retains.

The encoding unit 15 encodes a signal quantized by the quantization unit 5. Such encoding includes entropy encoding, for example. An encoding amount included in the quantized signal is reduced by such encoding.

Meanwhile, the signal encoding apparatus includes an output unit 16 for outputting the signal encoded by the encoding unit 15 as an output signal, for example, to a transmission unit (not shown) and a control unit (not shown) for controlling the respective units. The control unit retains a counter (not shown) for counting the above-described sample number.

When the input signal for one block is quantized based on the given quantization method and then the quantized input signal is encoded, the output unit 16 outputs the encoded input signal as an output signal.

Signal Encoding Method

A signal encoding method according to the embodiment 1, which is an example of the present invention, will be described below.

Firstly, an operator inputs the following information by use of the input unit. The information to be inputted to the input unit includes information concerning sample, sample number of one block, sample number of each subblock, sample number of each analysis frame, and instruction information concerning quantization method. The instruction information concerning quantization method is, for example, information indicating an instruction to make the amount of information of the encoding terms necessary for expressing the output signal remain within a certain amount. The information inputted to the input unit is transmitted to the control unit.

The control unit instructs the input signal value calculation unit 1 to calculate a signal value of an input signal for each sample code. Moreover, the control unit instructs the linear prediction analysis unit 2a to perform the linear prediction analysis for each analysis frame. Furthermore, the control unit instructs the weighting filter generation unit 2b to generate a weighting filter for each of the subblocks. Furthermore, the control unit instructs the transformation unit 3, for example, to perform the transforming process for each block. Here, as an example, description will be given on the case where the transformation unit 3 performs the DCT process. In addition, the control unit transmits the instruction information concerning quantization method to the quantization control unit 13. Thereafter, the following processing (the processing shown in FIG. 4 and FIG. 5) is performed.

Figure 4:
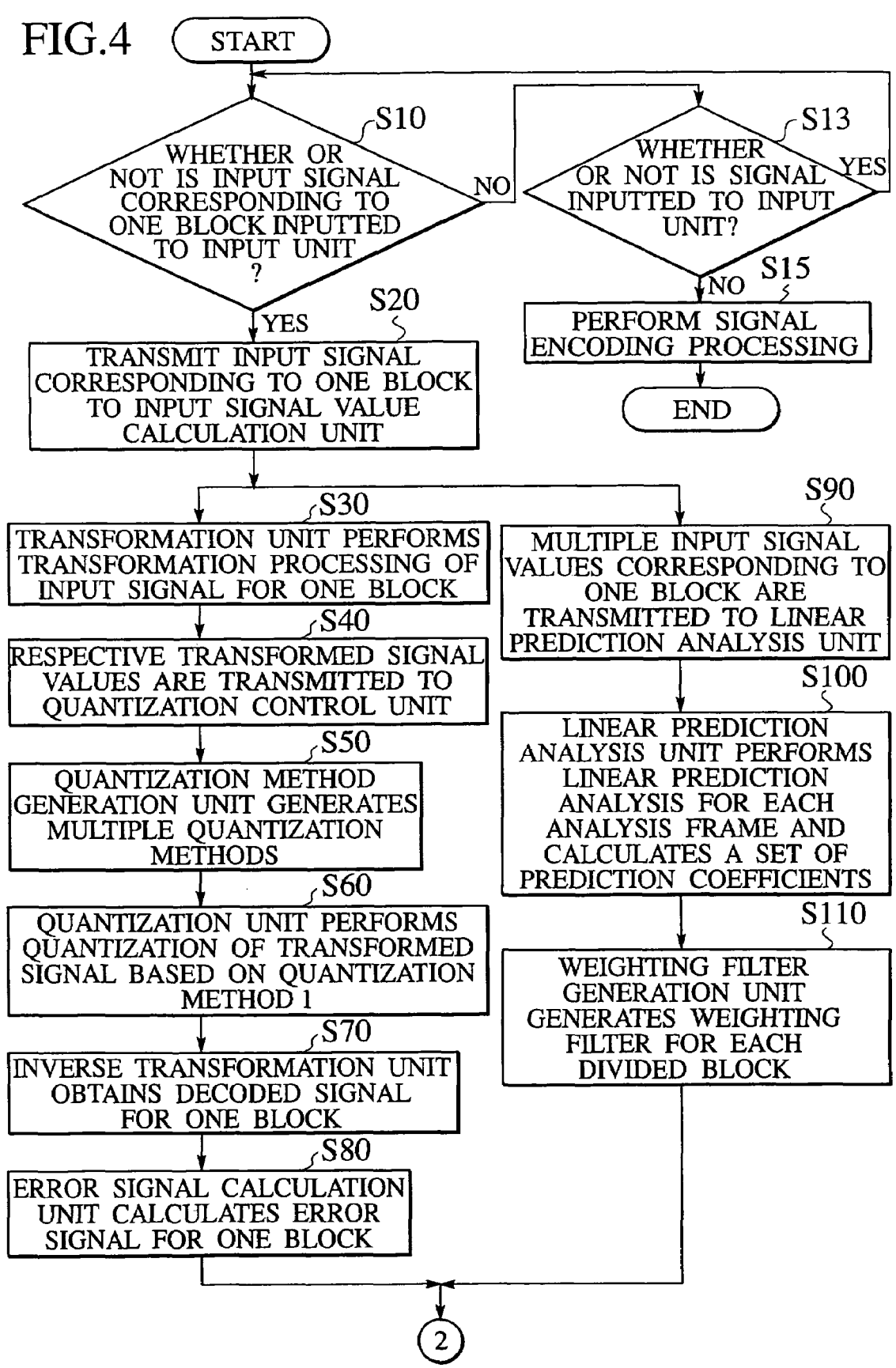
FIG. 4 is a flowchart showing a signal encoding method in the embodiment 1.
Figure 5:
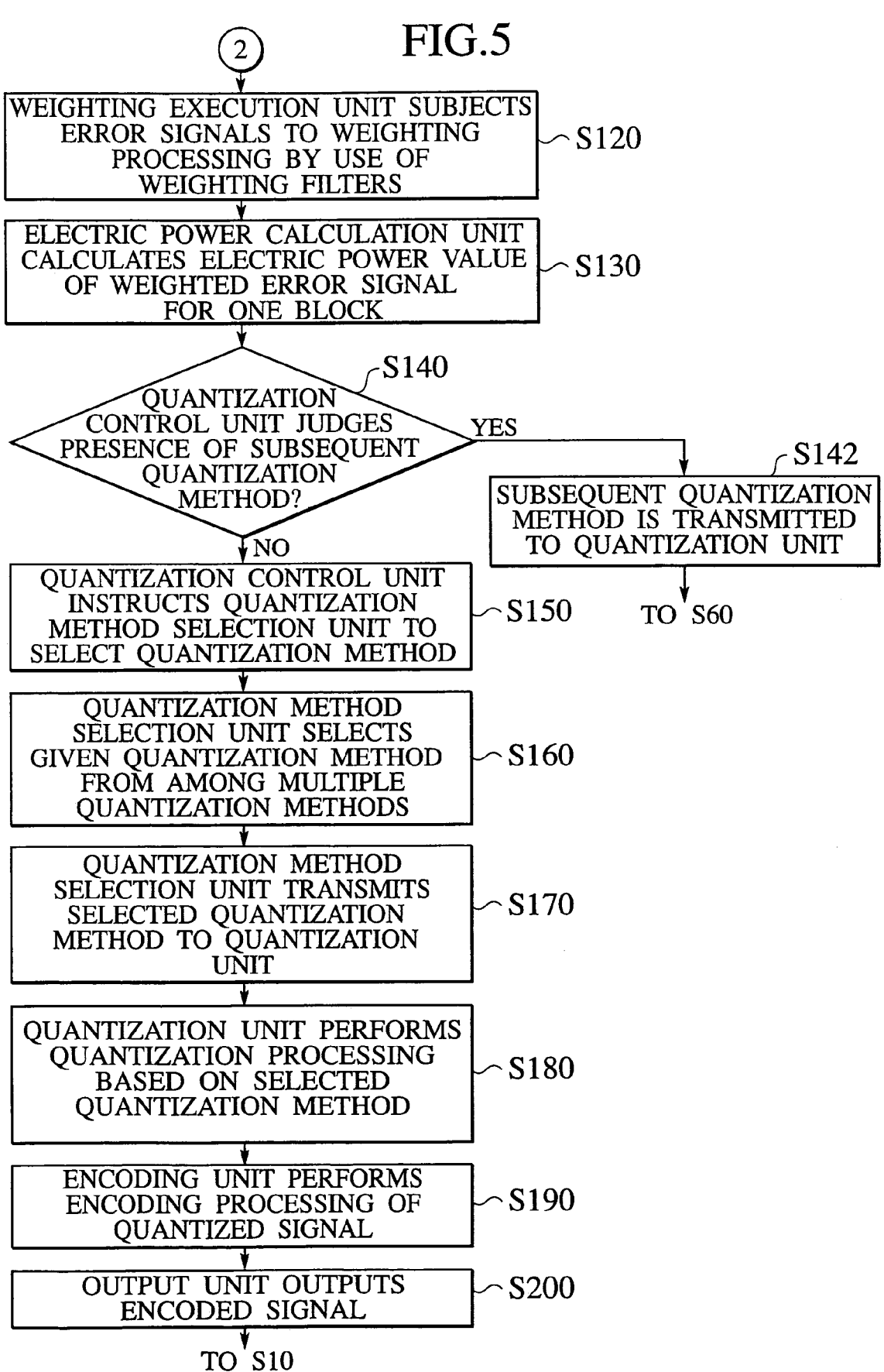
FIG. 5 is another flowchart showing the signal encoding method in the embodiment 1.

FIG. 4 and FIG. 5 are flowcharts for explaining the signal encoding method (operations) using the signal encoding apparatus according to the embodiment 1. Here, as an example, description will be given on the case where the output signal is outputted after the input signal shown in FIG. 2 is encoded.

In the flowcharts described below, processing from Steps S30 to S80 and processing from Steps S90 to S110 are performed in parallel. In this case, the processing from Steps S90 to S110 may be performed after the processing from Steps S30 to S80 is performed. Alternatively, the processing from Steps S30 to S80 may be performed after the processing from Steps S90 to S110 is performed. Note that a signal (input signal) is continuously (temporally continuously) inputted to the input unit.

In Step S10, the control unit judges whether a signal corresponding to one block (hereinafter referred to as the input signal corresponding to one block) is inputted to the input unit. For example, the control unit judges whether the input signal corresponding to sample number of one block is inputted.

Processing in Step S13 is performed when it is judged that the input signal is not inputted. On the contrary, the processing in Step S20 is performed when it is judged that the input signal is inputted.

In Step S13, the control unit judges whether an signal is inputted to the input unit. The processing in Step S10 is performed when it is judged that an signal is inputted to the input unit. On the contrary, the processing in Step S15 is performed when it is judged that an signal is not inputted to the input unit.

In Step S15, the signal encoding apparatus performs a signal encoding process (processing from Step S20 to Step S200) by use of the input signal inputted to the input unit. Thereafter, the processing is completed. Note that a method for completing the processing is not particularly limited to the above-described method in this embodiment.

In Step S20, the input signal corresponding to one block which was inputted to the input unit is transmitted to the input signal value calculation unit 1. Then, the input signal value calculation unit 1 calculates a signal value of the input signal corresponding to one block for each sample code based on the transmitted input signal. For example, when sample number equivalent to the predetermined time T corresponding to one block is equal to 1024, the input signal value calculation unit 1 calculates a signal value (f(n) (n is a sample code)) of the input signal for each sample code (code 0, 1, 2, . . . , 1023). Then, the input signal value calculation unit 1 transmits the input signal for one block (a plurality (such as 1024) of signal values of the input signal corresponding to one block) to the transformation unit 3.

In Step S30, the transformation unit 3 transforms the input signal into a transformed signal by performing the linear transformation of the input signal for one block. By this process, the time domain signal (the input signal) is transformed into the frequency domain signal (the transformed signal).

In Step S40, the transformation unit 3 transmits to the quantization unit 5 a plurality of signal values of the transformed signal corresponding to one block. The plurality of signal values of the transformed signal corresponding to one block are the plurality of signal values of the input signal corresponding to one block, the input signal being transformed by the transformed unit 3. The plurality of signal values of the transformed signal corresponding to one block will be hereinafter referred to as a plurality of transformed signal values corresponding to one block. Moreover, the respective transformed signal values corresponding to one block are linked with the respective frequencies.

The respective transformed signal values corresponding to one block are transmitted to the quantization control unit 13 through the quantization unit 5. In this event, the quantization unit 5 links the respective transformed signal values corresponding to one block with the respective frequencies. Moreover, the quantization unit 5 retains the transformed signal for one block (the transformed signal which has not been quantized).

The quantization control unit 13 instructs the quantization method generation unit 4 to generate the plurality of quantization methods based on the respective transformed signal values corresponding to one block and on the frequencies corresponding to the respective transformed signal values. In this event, the quantization control unit 13 transmits the instruction information concerning quantization method, which was transmitted from the control unit, to the quantization method generation unit 4.

In Step S50, the quantization method generation unit 4 generates the plurality of quantization methods based on the instruction information concerning quantization method. Concrete explanation of an example of the generating process by the quantization method generation unit 4 is as follows.

The quantization method generation unit 4 calculates the frequency characteristics of the transformed signal corresponding to one block based on the respective transformed signal values corresponding to one block and on the frequencies corresponding to the respective transformed signal values. Then, the quantization method generation unit 4 generates the plurality of quantization methods (the quantization method 1, the quantization method 2, and so on) based on the frequency characteristics. In this event, the quantization method generation unit 4 generates the respective quantization methods based on the instruction information concerning quantization method, for example, such that amount of information of encoding terms necessary for expressing the output signal remain within a certain amount. That is to say, the respective quantization methods are generated such that the discrete intervals related to each quantization method become equal to or greater than a certain amount of value. The quantization method generation unit 4 retains the plurality of quantization methods thus generated. For example, the quantization method generation unit 4 firstly transmits the quantization method 1 to the quantization unit 5.

In Step S60, the quantization unit 5 quantizes the transformed signal for one block based on the transmitted quantization method 1. Incidentally, as described above, the quantization unit 5 may retain the transformed signal for one block thus quantized.

In Step S70, the quantization unit 5 links a quantized signal for one block indicating the transformed signal for one block thus quantized, with the quantization method 1. Then, the quantized signal for one block is transmitted to the inverse transformation unit 7 through the dequantization unit 6. The inverse transformation unit 7 obtains a decoded signal for one block by performing an inverse transforming process. The inverse transformation unit 7 transmits the decoded signal for one block to the error signal calculation unit 8. By the processing in Step S70, the frequency domain signal is transformed into the time domain signal (the decoded signal).

In Step S80, the error signal calculation unit 8 calculates an error signal for one block indicating a differential signal between the decoded signal for one block and the input signal for one block. Then, the error signal calculation unit 8 links the error signal for one block with the quantization method 1. Thereafter, when the error signal calculation unit 8 generates the error signal for one block corresponding to the quantization method 1, the error signal calculation unit 8 transmits information indicating generation of the error signal for one block corresponding to the quantization method 1 to the control unit.

In the meantime, the following processing is also performed in parallel to the above-described processing from Step S30 to Step S80.

In this event, in Step S10, the control unit also performs judgment as to whether or not input signal necessary for the linear prediction analysis is inputted in addition to the input signal for one block. Then, processing in Step S90 is performed when it is judged that the input signal necessary for the linear prediction analysis has been also inputted.

In Step S90, a plurality of signal values of the input signal corresponding to one block are transmitted to the linear prediction analysis unit 2a. The plurality of signal values of the input signal corresponding to one block will be hereinafter referred to as a plurality of input signal values corresponding to one block. The linear prediction analysis unit 2a generates a plurality of analysis frames corresponding to one block based on sample number of one block. When input signal of a precedent and/or subsequent block includes a signal necessary for the linear prediction analysis, the linear prediction analysis unit 2a generates the analysis frames in consideration of the signal.

For example, explanation using FIG. 2 is as follows. When the sample number of one block is equal to 1024, for example, the linear prediction analysis unit 2a generates four analysis frames (k=1 to 4) each having the sample number equal to 384.

In Step S100, the linear prediction analysis unit 2a performs the linear prediction analyzing process for each analysis frame. Then, the linear prediction analysis unit 2a calculates a set of prediction coefficients for each analysis frame.

For example, the linear prediction analysis unit 2a calculates each prediction coefficient corresponding to an analysis frame (k=1) as a prediction coefficient α1i (i=1 to M: M is an order of the linear prediction analysis). Similarly, the linear prediction analysis unit 2a calculates each prediction coefficient corresponding to an analysis frame (k=2) as a prediction coefficient α2i (i=1 to M: M is the order of the linear prediction analysis). Similarly, the linear prediction analysis unit 2a calculates each prediction coefficient corresponding to an analysis frame (k=3) as a prediction coefficient α3i (i=1 to M: M is the order of the linear prediction analysis). Similarly, the linear prediction analysis unit 2a calculates each prediction coefficient corresponding to an analysis frame (k=4) as a prediction coefficient α4i (i=1 to M: M is the order of the linear prediction analysis).

In Step S110, the weighting filter generation unit 2b generates a weighting filer for each of the subblocks based on the set of prediction coefficients which were transmitted from the linear prediction analysis unit 2a. Concrete explanation of the generating process by the weighting filter generation unit 2b is as follows.

The weighting filter generation unit 2b generates a weighting filter Wk1 to be applied to an error signal of the subblock (k=1) based on the prediction coefficient α1i. Similarly, the weighting filter generation unit 2b generates weighting filters Wk2, Wk3, and Wk4 to be applied to error signals of the subblocks (k=2, 3, and 4). Thereafter, when the weighting filter generation unit 2b generates the weighting filters corresponding to all the subblocks included in one block, the weighting filter generation unit 2b retains the respective weighting filters. Then, the weighting filter generation unit 2b transmits information indicating generation of all the weighting filters to the control unit.

In Step S120, the control unit performs the following processing when the information indicating generation of the error signal for one block corresponding to the quantization method 1 and the information indicating generation of the weighting filters corresponding to the respective subblocks included in one block are transmitted to the control unit.

The control unit instructs the error signal calculation unit 8 to transmit the error signal for one block corresponding to the quantization method 1 to the weighting execution unit 10. Moreover, the control unit instructs the weighting filter generation unit 2b to transmit the weighting filters corresponding to the respective subblocks included in one block to the weighting execution unit 10.

The weighting execution unit 10 subjects the error signal to a weighting process by use of the weighting filters which are calculated by the weight calculation unit 2. Concrete explanation of the processing by the weighting execution unit 10 is as follows.

The weighting execution unit 10 subjects each signal value of an error signal of each subblock to the weighting process by use of the weighting filters. The weighting execution unit 10 subjects each signal value of the error signal of the subblock (k=1) to the weighting process by use of a weighting filter Wk1(Z). Similarly, the weighting execution unit 10 subjects each signal value of the error signal of each subblock (k=2 to 4) to the weighting process by use of weighting filters Wk2 to k4(Z).

Note that "to subject each signal value of an error signal to the weighting process by use of the filter" means, for example, "to perform a convolution operation by use of each error signal value and impulse responses of the filter."

Then, the weighting execution unit 10 performs the following processing when completing the weighting process. The weighting execution unit 10 links the error signal for one block thus weighted (the weighted error signal for one block) with the quantization method 1. Thereafter, the weighting execution unit 10 transmits the weighted error signal for one block to the electric power calculation unit 11.

In Step S130, the electric power calculation unit 11 calculates an electric power value of the weighted error signal for one block. Then the electric power calculation unit 11 links the calculated electric power value with the quantization method 1. Thereafter, the electric power calculation unit 11 transmits the calculated electric power value to the quantization method selection unit 12. Moreover, the electric power calculation unit 11 transmits information indicating completion of the calculating process of the electric power value corresponding to the quantization method 1 to the quantization control unit 13.

In Step S140, the quantization control unit 13 accesses the quantization method generation unit 4. Then, the quantization control unit 13 judges whether or not the quantization method generation unit 4 retains a subsequent quantization method. For example, when information indicating completion of the calculating process of the electric power value corresponding to the quantization method 1 is transmitted to the quantization control unit 13, the quantization control unit 13 judges whether or not the quantization method generation unit 4 retains the quantization method 2.

The following processing is performed when the quantization control unit 13 judges that the quantization method generation unit 4 retains the subsequent quantization method. In Step S142, the subsequent quantization method (such as the quantization method 2) is transmitted to the quantization unit 5 through the quantization control unit 13. Then, the processing from Step S60 to Step S80 is performed. In this event, the weighting filter generation unit 2b retains the respective weighting filters which have been generated already. Then, in Step S80, an error signal corresponding to the subsequent quantization method (such as the quantization method 2) is calculated. The error signal calculation unit 8 transmits the calculated error signal to the weighting execution unit 10. Moreover, the weighting filter generation unit 2b transmits the respective weighting filters, which the weighting filter generation unit 2b retains, to the weighting execution unit 10. Thereafter, the processing from Step S120 to Step S140 is performed.

On the contrary, processing in Step S150 is performed when the quantization control unit 13 judges that the quantization method generation unit 4 does not retain the subsequent quantization method.

In Step S150, the quantization control unit 13 instructs the quantization method selection unit 12 to perform a selecting process of the quantization method. In Step S160, the quantization method selection unit 12 selects a given quantization method from among the plurality of quantization methods. To be more precise, the quantization method selection unit 12 compares electric power values (each electric power value of the weighted error signal for one block) corresponding to the respective quantization methods (the quantization methods 1, 2, 3, and so on) with one another. Then, for example, the quantization method selection unit 12 selects a given quantization method which corresponds to the lowest electric power value from among the respective quantization methods. Note that the method of selection by the quantization method selection unit 12 may be different from the above-described method. Thereafter, the quantization method selection unit 12 transmits the selected quantization method to the quantization control unit 13.

In Step S170, the quantization control unit 13 instructs the quantization method generation unit 4 to transmit the selected quantization method to the quantization unit 5. The quantization method generation unit 4 transmits the selected quantization method to the quantization unit 5.

In Step S180, the quantization unit 5 quantizes the transformed signal for one block, which the quantization unit 5 retains, based on the selected quantization method. The quantization unit 5 transmits the transformed signal for one block thus quantized to the encoding unit 15.

In Step S190, the encoding unit 15 encodes the signal quantized by the quantization unit 5 (the transformed signal for one block). The encoded signal is transmitted to the output unit 16.

In Step S200, the output unit 16 transmits the encoded signal to the transmission unit as an output signal. Moreover, the output unit 16 transmits information indicating completion of the encoding process of the input signal for one block to the control unit. Thereafter, the processing in Step S10 is performed.

Operation And Effects

According to the embodiment 1, the transforming process of the input signal by the transformation unit 3, the quantizing process of the signal by the quantization unit 5, and the encoding process of the signal by the encoding unit 15 are performed for each predetermined block having the relatively long block length (such as the one block). For this reason, reduction in the frequency resolution of the input signal and reduction in the encoding efficiency of the input signal are prevented.

Moreover, the weight calculation unit 2 calculates a weight related to degree concerning whether or not quantization noise corresponding to an error signal of a short block (such as the subblock) which is a shorter block than the predetermined block, is virtually imperceptible for the user, for each short block included in the predetermined block.

Meanwhile, the quantization unit 5 performs quantization of the input signal of the predetermined block based on each of the plurality of quantization methods. For this reason, the respective decoded signals obtained through the dequantizing process by the dequantization unit 6 are linked with the respective quantization methods. As a result, it is possible to say that the respective error signals calculated by the error signal calculation unit 8 are also linked with the respective quantization methods.

Moreover, when the plurality (the number of the error signals of the predetermined block) of weighted error signals (weighted error signals corresponding to the predetermined block), each of which indicates a signal obtained by assigning a weight corresponding to each short block included in the predetermined block to an error signal of each short block, are generated, the quantization method selection unit 12 can perform the following processing.

The quantization method selection unit 12 can compare the plurality of weighted error signals with one another and select a given weighted error signal based on a result of the comparison. It is possible to say that the given weighted error signal is linked with a given quantization method. Accordingly, selection of the given weighted error signal is equivalent to selection of the given quantization method. Moreover, the weighted error signal is provided with a weight related to degree concerning whether or not quantization noise corresponding to an error signal is virtually imperceptible for the user.

When the weighting process by use of this weight is performed, it is possible to control the quantization noise as follows. Specifically, by the weighting process, it is possible to control the quantization noise in a way that large quantization noise is given to frequency domain having large signal value of the input signal corresponding to each subblock and in a way that small quantization noise is given to frequency domain having small signal value of the input signal corresponding to each subblock. Since the weighting process is performed on all the subblocks included in the predetermined block, it is possible to control the quantization noise to an extent of being virtually imperceptible for the user.

For this reason, it is possible to say that the given quantization method thus selected is the quantization method which renders the quantization noise virtually imperceptible for the user.

Therefore, the quantization method selection unit 12 can select the given quantization method (the quantization method which render the quantization noise virtually imperceptible for the user) from among the plurality of quantization methods.

For example, the weight calculation unit 2 calculates, for each of the subblocks (short blocks) included in the predetermined block, a weight related to degree concerning whether or not quantization noise corresponding to an error signal of the subblock is virtually imperceptible for the user. For this reason, even when the frequency characteristics of the input signal of the respective subblocks included in the predetermined block differ to a large extent from one another, the weight calculation unit 2 can calculate the following weight for each of the subblocks. The weight calculation unit 2 can calculate the weight corresponding to inaudibility for the user of quantization noise corresponding to an error signal of each subblock.

Then, the weighting execution unit 10 generates a weighted error signal (a weighted error signal in the predetermined block (such as one block)), which is obtained by providing an error signal of each subblock (each of the subblocks 1 to 4) included in the predetermined block with a weight (such as weighting filter W1 to W4) corresponding to each subblock, for an error signal of each predetermined block (error signal 1, 2, 3, and so on).

For this reason, each weighted error signal is provided with a weight related to degree concerning whether or not quantization noise corresponding to an error signal of each subblock is virtually imperceptible for the user. When the weighting process by use of the weight is performed, it is possible to control the quantization noise as follows. Specifically, by the weighting process, it is possible to control the quantization noise in a way that large quantization noise is given to frequency domain having large signal value of the input signal corresponding to each subblock, and in a way that small quantization noise is given to frequency domain having small signal value of the input signal corresponding to each subblock. By performing the weighting process on all the subblocks included in the predetermined block, it is possible to control the quantization noise to an extent of being virtually imperceptible for the user. As a result, it is possible to say that the given quantization method thus selected is a quantization method which renders the quantization noise corresponding to an error signal of each subblock fully perceptible for the user.

Therefore, the quantization method selection unit 12 can select the given quantization method (the quantization method which render the quantization noise corresponding to an error signal of each subblock virtually imperceptible for the user) from among the plurality of quantization methods.

For example, the quantization method selection unit 12 compares the electric power values of the plurality of weighted error signals calculated by the electric power calculation unit 11 with one another. Then, the quantization method selection unit 12 can select, from among the electric power values of the plurality of weighted error signals, the lowest electric power value, for example. Moreover, since it is possible to say that each weighted error signal is linked with each quantization method, it is possible to say that an electric power value of each weighted error signal is also linked with each quantization method. For this reason, selection of a given electric power value is equivalent to selection of a given quantization method. Therefore, the quantization method selection unit 12 can select a quantization method linked with the lowest electric power value from among the plurality of quantization methods. In this way, a quantization method is selected, which can remove an error signal in a way that quantization noise is the most inaudible for the user.

By performing the quantizing process based on the quantization method selected as described above, the following effects are obtained even when characteristics of the input signal vary depending on consecutive short time periods. Specifically, the user hardly perceive quantization noise included in the decoded signal. Moreover, reduction in the frequency resolution and reduction in the encoding efficiency are prevented. As a result, it is possible to improve subjective quality of voice signals and sound signals.

Moreover, the quantization method generation unit 4 generates the plurality of quantization methods based on the amount of information of encoding terms necessary for expressing the output signal to be outputted from the output unit 16. Accordingly, occurrence of an increase in the amount of information of the encoding terms necessary for expressing the output signal to be outputted from the output unit 16 is avoided. Since the number of the quantization methods is limited in this case, the quantization method selection unit 12 can perform the selecting process promptly.

Meanwhile, in this invention, the decoded signal corresponding to the input signal includes not only the signal obtained by dequantizing the quantized input signal but also a signal obtained by performing dequantization and inverse linear transformation on the input signal which was subjected to linear transformation and quantization. That is to say, the decoded signal means a signal obtained by restoring the input signal which was subjected to certain processing. The certain processing is not particularly limited in the present invention.

(A Case where the Transforming Process by the Transformation Unit 3 is an MDCT Process)

In the above-described embodiment, description has been made on the case where the transforming process is the DCT process. This embodiment is similarly applicable to a case in which another orthogonal transformation (such as modified discrete cosine transform (MDCT), discrete Fourier transform, or discrete wavelet transform) is used.

As an example, a case where the transforming process is the MDCT will be described as follows. Explanation of functions and configurations identical to those in the above-described embodiment will be omitted.

In the case of the MDCT as well, the configuration of the signal encoding apparatus is identical to the configuration shown in FIG. 1. However, the functions of the respective units are changed as follows. Explanation of the signal encoding method in the case of the MDCT will be shown below by use of the flowcharts of FIG. 4 and FIG. 5. Note that explanation of different points from those in the case of the DCT will be mainly made in the description below.

In Step S10, the control unit judges whether or not, after an input signal corresponding to one block was newly inputted to the input unit, input signal corresponding to two blocks has been inputted. The sample number of two blocks is equal to 2048. In Step S20, the input signal corresponding to two blocks which was inputted by the input unit is transmitted to the input signal value calculation unit 1, and signal values are calculated. In Step S30, the transforming process of the input signal for two blocks is performed.

In the case of using the MDCT, when windowing process is performed on an input signal value x(n) for each of 2N points, a transformed signal value X(m) is expressed by the following formula:

$$X(m) = 2\sum_{n=0}^{2N-1} win_1(n)x(n)\cos\left\{\frac{(2n+1+N)(2m+1)\pi}{4N}\right\} \quad \text{[Formula 6]}$$

wherein 1(n) indicates, for example, a sine window. In addition, $0 \leq m \leq N-1$ holds true. Moreover, N is the sample number of one block (in this case, 1024).

Then, in Step S50, the quantization method generation unit 4 calculates frequency characteristics of the transformed signal corresponding to two blocks based on the respective transformed signal values corresponding to two blocks and on frequencies corresponding to the respective transformed signal values. Then, the quantization method generation unit 4 generates a plurality of quantization methods.

Thereafter, in the processing from Step S60 to 70, the inverse transformation unit 7 calculates an inversely transformed signal value $Y_R(n)$ which is obtained by windowing of a sine window win2(n). Then, the inverse transformation unit 7 calculates a decoded signal value x1(n) by use of an inversely transformed signal value $Y_{R-1}(n)$ that the inverse transformation unit 7 retains (an inversely transformed signal value calculated in the signal encoding process for a precedent one block) and the inversely transformed signal value $Y_R(n)$.

Here, the inversely transformed signal value $y_R(n)$ is expressed in the following formula:

$$Y_R(n) = \frac{1}{N}\sum_{m=0}^{N-1} win_2(n)X(m)\cos\left\{\frac{(2n+1+N)(2m+1)\pi}{4N}\right\} \quad \text{[Formula 7]}$$

In the formula 7, $0 \leq n \leq 2N-1$ holds true. N is the sample number of one block.

Meanwhile, a decoded signal value x1(n) is expressed by the following formula.

A relation $x1(n) = Y_{R-1}(n+N) + Y_R(n)$ holds true. In this formula, $0 \leq n \leq N-1$ holds true.

Here, the MDCT transform is lapped orthogonal transform. For this reason, the inverse transformation unit 7 does not obtain decoded signal corresponding to two blocks but obtain the decoded signal corresponding to the former one block of the two blocks.

In Step S80, an error signal for one block indicating a differential signal between the input signal for one block and the decoded signal for the one block is calculated. The input signal for one block is an input signal for the temporally former one block of two blocks.

In Steps S90, 100, and 110, the same processing as the embodiment 1 is performed. Specifically, the linear prediction analyzing process is performed for each of the analysis frames (sample number of each analysis frame is equal to 384). Moreover, the weighting filter generating process is performed for each of the subblocks (sample number of each subblock is equal to 256). In this event, the input signal for the former one block of two blocks is transmitted to the weight calculation unit 2. The processing from Steps S120 to S170 is identical to the case in the embodiment 1.

In Step S180, the quantization unit 5 performs the quantizing process based on the selected quantization method.

In Step S190, the processing by the encoding unit 15 and the processing by the output unit 16 are identical to those in the first embodiment. However, a signal, which is transmitted by the transmission unit and then received by a reception unit and decoded, is a signal corresponding to the former one block.

Thereafter, the control unit retains the input signal corresponding to the latter one block of the two blocks. Then, the control unit judges whether an input signal corresponding to the new one block has been inputted. The processing is completed when it is judged that the input signal has not been inputted. On the contrary, the control unit performs the following processing when it is judged that the input signal has been inputted. The control unit generates an input signal corresponding to the two blocks by combining the input signal corresponding to the latter one block which the control unit retains and the input signal corresponding to the new one block. Then, the processing after Step S20 is performed. The input signal value calculation unit 1 may perform the retaining process of the temporally latter one block after calculating the input signal values.

EMBODIMENT 2

Figure 6:
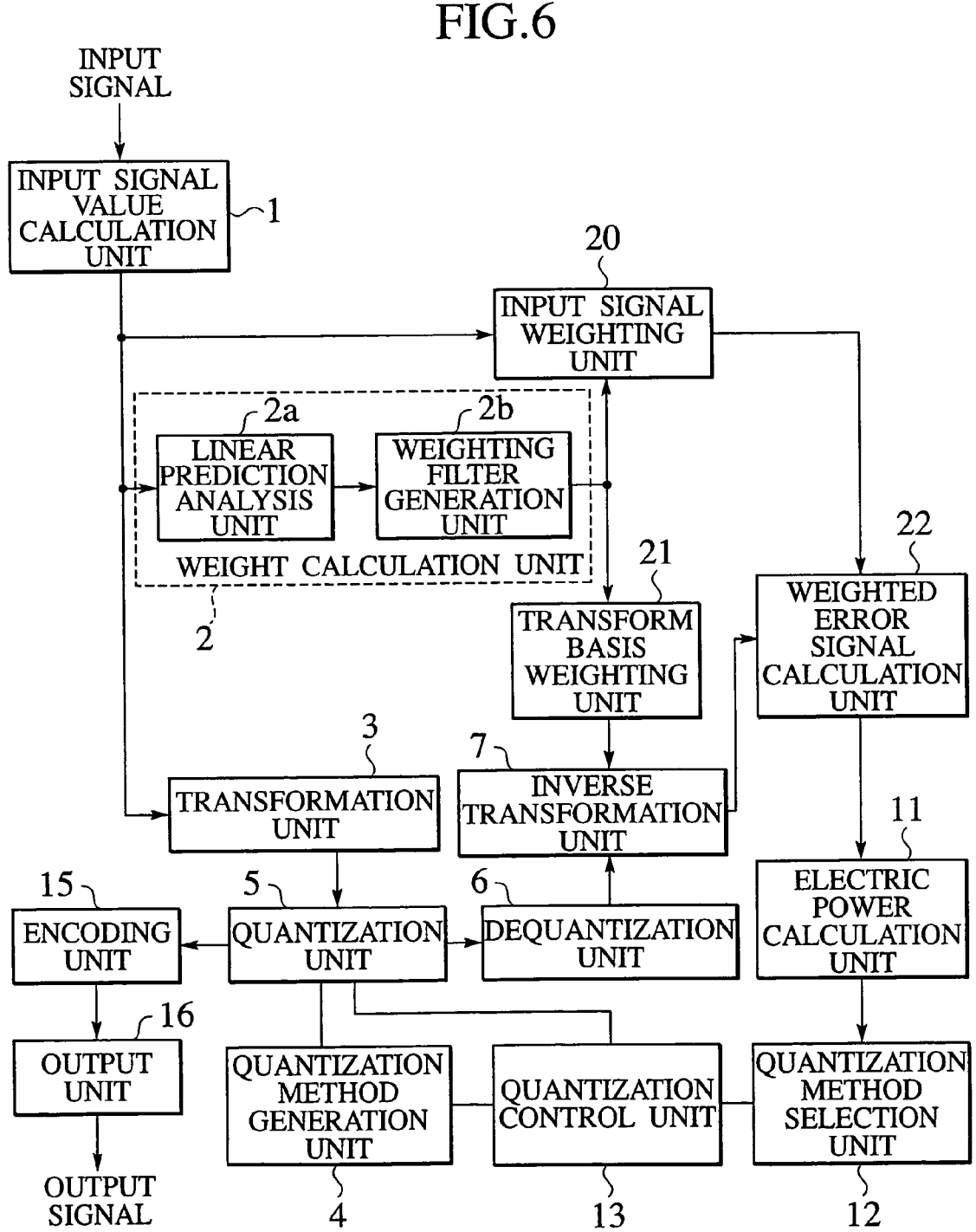
FIG. 6 is a view showing a configuration of a signal encoding apparatus in an embodiment 2.

FIG. 6 is a view showing a configuration of a signal encoding apparatus in an embodiment 2. In FIG. 6, the same configurations and functions as those of the signal encoding apparatus in the embodiment 1 are designated with the same reference numerals and description thereof will be omitted.

The signal encoding apparatus in the embodiment 2 does not include the error signal calculation unit 8 and the weighting execution unit 10. The signal encoding apparatus of the embodiment 2 includes an input signal weighting unit 20, a transform basis weighting unit 21, and a weighted error signal calculation unit 22.

In this embodiment, the case where the transforming process by the transformation unit 3 is the DCT process will be described as an example. However, as described above, this embodiment is similarly applicable to the case where the transforming process by the transformation unit 3 is the orthogonal transformation such as the MDCT process.

The input signal weighting unit 20 subjects the input signal for one block to the weighting process by use of the weighting filter corresponding to each subblock which is generated by the weighting filter generation unit 2b.

The transform basis weighting unit 21 subjects a transform basis, which the transform basis weighting unit 21 retains, to the weighting process by use of the weighting filter generated by the weighting filter generation unit 2b.

For example, a DCT transform basis which is an example of the transform basis is expressed by the following formula:

$$bm(n) = \cos\left[\frac{(2n+1)m\pi}{2N}\right] \quad \text{[Formula 8]}$$

where N is a transform length (the sample number, such as 1024). In addition, m=0 ... N−1 and n=0 ... N−1 hold true.

Moreover, a weighted transform basis which is obtained by subjecting the transform basis to the weighting process by use of a weighting filter Wk by the transform basis weighting unit 21 can be expressed as BMwk(n). Here, n is the sample code.

In the case of FIG. 2, the weighted transform bases are BMw1(n) (n ranges from 0 to 255), BMw2(n) (n ranges from 256 to 511), BMw3(n) (n ranges from 512 to 767), and BMw4(n) (n ranges from 768 to 1023).

Further, after the transform basis weighting unit 21 subjects a base portion of Formula 2 (i.e. Formula 8) to the weighting process by use of Wk, the inverse transformation unit 7 performs the inverse transforming process of the transformed signal outputted from the dequantization unit 6 by use of the weighted transform bases. As a result, the signal to be outputted from the inverse transformation unit 7 becomes a decoded signal subjected to weighting (hereinafter referred to as a weighted decoded signal).

The weighted error signal calculation unit 22 calculates a weighted error signal which is an error signal between the weighted input signal for one block transmitted from the input signal weighting unit 20 and the weighted decoded signal for one block transmitted from the inverse transformation unit 7.

Thereafter, the electric power calculation unit 11 calculates a plurality of electric power values of the weighted error signals. Such formula for calculating the electric power value is different from that in the embodiment 1, and is defined as follows:

$$WE = \sum_{k=1}^{K} \sum_{n=T_k}^{T_{k+1}-1} |wx1(n) - wx2(n)|^2 \quad \text{[Formula 9]}$$

where wx1(n) is a signal value of the weighted input signal and wx2(n) is a signal value of the weighted decoded signal. K indicates the number of weighting filters corresponding to one block. Tk is an initial sample code to which a k-th weighting filter is applied. Moreover, (Tk+1)−1 (k=K) indicates a final sample code of the respective sample codes corresponding to one block.

Signal Encoding Method

The signal encoding method in the embodiment 2 will be explained as follows. The explanation by use of FIG. 4 and FIG. 5 is shown below. Incidentally, explanation of the same processing as that in the signal encoding method in the embodiment 1 will be omitted.

Firstly, the processing from Step S10 to Step S20 is performed. Then, the processing from Step S30 to Step S60 is performed.

In the meantime, the processing from Steps S90 to S110 is performed as is the case with the embodiment 1. Then, the input signal weighting unit 20 subjects the input signal for one block to the weighting process by use of the weighting filters. Then, in the embodiment 2, the following processing is performed instead of Steps S70 and S80. Instead of Step S70, the transform basis weighting unit 21 generates the above-described weighted transform basis BMwk(n).

Then, the inverse transformation unit 7 performs the following processing on the signal which has been dequantized by the dequantization unit 6. The inverse transformation unit 7 performs the inverse transforming process by use of the weighted transform basis BMwk(n). Then, the inverse transformation unit 7 outputs the weighted decoded signal.

Moreover, instead of Step S80, the weighted error signal calculation unit 22 calculates the weighted error signal which is the error signal between the weighted input signal for one block transmitted from the input signal weighting unit 20 and the weighted decoded signal for one block transmitted from the inverse transformation unit 7. Then the weighted error signal calculation unit 22 links the weighted error signal with a given quantization method.

Thereafter, in Step S130, the electric power calculation unit 11 calculates the plurality of electric power values of the weighted error signals. This calculating process of the electric power values is performed, for example, in accordance with the Formula 9.

The processing thereafter is identical to the processing after Step S140. In this embodiment as well, the same effects as those obtained in the embodiment 1 are obtained.

Modifications of the embodiments 1 and 2 are as follows.

Modification 1

The selecting process by the quantization method selection unit 12 may be performed as follows, for example. In the processing in Step S130, the quantization method selection unit 12 sets a standard value concerning the electric power value of the weighted error signal for one block based on the input signal for one block. The standard value may be determined based on a condition corresponding to in audibility of the quantization noise for the user, for example.

Then, when an electric power value calculated by the electric power calculation unit 11 is transmitted, the quantization method selection unit 12 performs the following processing. The quantization method selection unit 12 compares the transmitted electric power value with the standard value. Then, if the transmitted electric power value is equal to or less than the standard value, the quantization method selection unit 12 selects a quantization method corresponding to the transmitted electric power value (a predetermined quantization method) from among the plurality of quantization methods. Then, the information indicating selection of the predetermined quantization method is transmitted to the quantization control unit 13. When the predetermined quantization method is selected by the quantization method selection unit 12, the quantization control unit 13 (an instruction unit) instructs the quantization unit 5 not to perform the quantizing process based on any quantization method other than the predetermined quantization method. Thereafter, the processing after S170 is performed.

Meanwhile, when the transmitted electric power value is equal to or more than the standard value, the processing in Steps S140 and S142 is performed.

According to this modification 1, the following effects are obtained in addition to the effects obtained in the embodiment 1. The quantization unit 5 does not need to perform the quantizing process based on unnecessary quantization methods. Accordingly, the quantizing process of the input signal by the quantization unit 5 is performed promptly. As a result, the output unit 16 can output the output signal promptly.

Modification 2

In the signal encoding apparatuses of the embodiments 1 and 2, the weight calculation unit 2 may be modified as follows.

Figure 7:
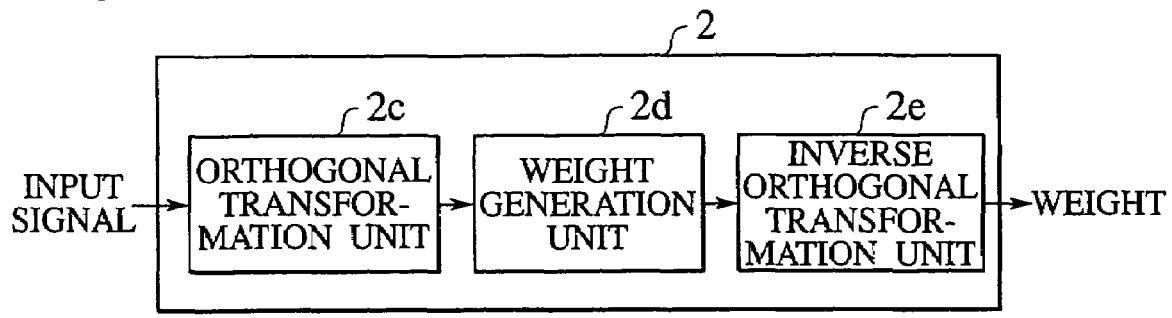
FIG. 7 is a view showing a configuration of a weight calculation unit in a modification 2.

FIG. 7 is a view showing a configuration of the weight calculation unit 2 in a modification 2. The weight calculation unit 2 includes an orthogonal transformation unit 2c, a weight generation unit 2d, and an inverse orthogonal transformation unit 2e.

The orthogonal transformation unit 2c performs an orthogonal transforming process of the input signal of each of the subblocks included in one block for each subblock. Moreover, the orthogonal transformation unit 3 transmits transformed signal values corresponding to each subblock and frequency corresponding to each transformed signal value to the weight generation unit 2d. As described above, the orthogonal transforming process includes the DCT process, the MDCT process, the discrete Fourier transform process, and the discrete wavelet transform process, for example.

The weight generation unit 2d generates, for each of the subblocks, a weight related to the degree concerning whether or not the quantization noise corresponding to the error signal of the subblock is virtually imperceptible for the user, based on the transformed signal corresponding to the subblock. To be more precise, the weight generation unit 2d generates the weight which effectuates a kind of control that the quantization noise is increased in the frequency domain having the large signal value of the input signal of each subblock and the quantization noise is decreased in the frequency domain having the small signal value of the input signal of each subblock.

In this way, a balance is maintained between inaudibility of the quantization noise in the frequency domain having the large transformed signal value and inaudibility of the quantization noise in the frequency domain having small transformed signal value. When the comparing process of the quantization noise subjected to weighting is performed and the quantizing process is performed by use of the given quantization method selected based on the result of the comparison, the quantization noise in the entire frequency domain becomes almost inaudible for the user.

Meanwhile, the weight generation unit 2d can generates the weight by use of a masking model. Specifically, for example, the weight generation unit 2d generates a weight which effectuates the control such that the quantization noise is increased in the frequency domain having the large transformed signal value and the quantization noise is decreased in the frequency domain having the small transformed signal value.

Moreover, when the weight generation unit 2d performs the weighting process of the input signal for all the subblocks included in one block, the weight generation unit 2d performs the following processing. The weight generation unit 2d transmits the weights corresponding to the respective subblocks to the inverse orthogonal transformation unit 3.

The inverse orthogonal transformation unit 3 performs an inverse orthogonal transforming process of the respective weights. By this process, the weights in the frequency domain are transformed into the weights in the time domain. The effects obtained in the embodiments 1 and 2 are also obtained in this modification.

Modification 3

Figure 8:
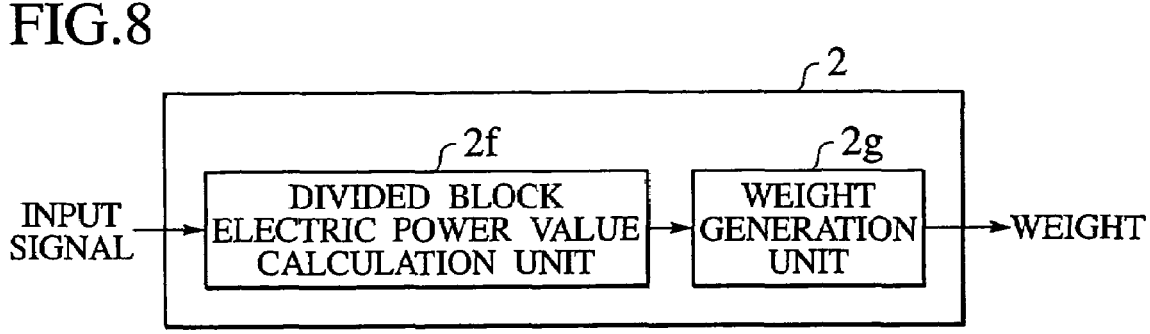
FIG. 8 is a view showing a configuration of a weight calculation unit in a modification 3.

In the signal encoding apparatuses shown in the embodiments 1 and 2, the weight calculation unit 2 may be modified as follows. FIG. 8 is a view showing a configuration of the weight calculation unit 2 in a modification 3. The weight calculation unit 2 in the modification 3 includes a subblock electric power value calculation unit 2f and a weight generation unit 2g.

The subblock electric power value calculation unit 2f calculates, for each of the subblocks included in one block, a signal electric power value (a signal electric power value relative to time) indicating the electric power value of the input signal of the subblock. Here, the signal electric power value is a value indicating a sum of electric power values of input signal values corresponding to each subblock. Then, the respective signal electric power values are transmitted to the weight generation unit 2g.

The weight generation unit 2g performs the following processing based on the signal electric power values linked with the respective subblocks. The weight generation unit 2g generates, for each of the subblocks, a weight related to the degree concerning whether or not the quantization noise corresponding to the error signal of the subblock is virtually imperceptible for the user. To be more precise, the weight generation unit 2g generates a weight which effectuates the control such that the large quantization noise is not given to the transformed signal of subblock which corresponds to the low signal electric power value.

In this way, a balance is maintained between inaudibility of the quantization noise in the subblock having the large signal electric power value and inaudibility of the quantization noise in the subblock having the small signal electric power value. When the comparing process of the quantization noise subjected to weighting is performed and the quantizing process is performed by use of the given quantization method selected based on the result of the comparison, the quantization noise in the entire frequency domain becomes almost inaudible for the user.

Then, the weight generation unit 2g performs the above-described weighting process for each of subblocks included in one block. By this process, the weight is generated for each of the subblocks included in one block. The effects of the first and second embodiments are also obtained in this modification.

Modification 4

Meanwhile, in the signal encoding apparatuses shown in the embodiments 1 and 2, the weight calculation unit 2 may have the following functions instead of the functions in the embodiments 1 and 2.

Figure 9:
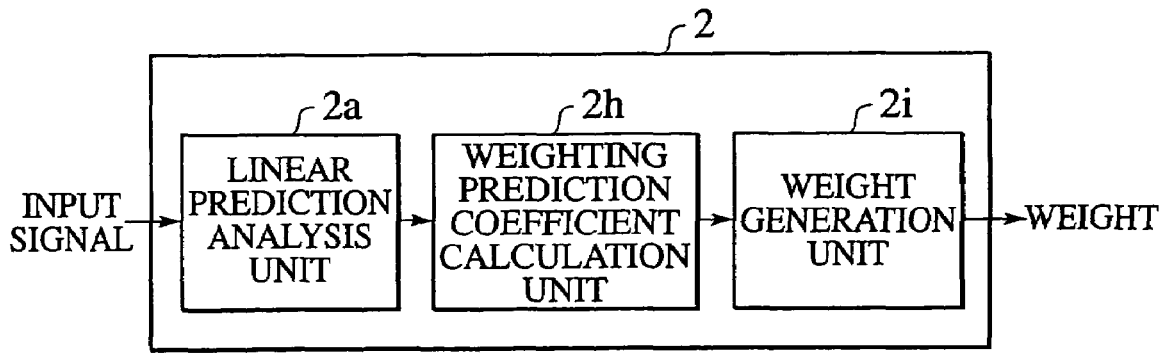
FIG. 9 is a view showing a configuration of a weight calculation unit in a modification 4.

FIG. 9 is a view showing a configuration of the weight calculation unit 2 of a modification 4. The weight calculation unit 2 includes the linear prediction analysis unit 2a, a weighting prediction coefficient calculation unit 2h, and a weight generation unit 2i.

The linear prediction analysis unit 2a calculates the linear prediction coefficients (the linear prediction parameters) by performing the linear prediction analysis for each of the analysis frames (the subblocks) by way of the above-described method. Then, the respective linear prediction coefficients are transmitted to the weighting prediction coefficient calculation unit 2h.

Thereafter, the weighting prediction coefficient calculation unit 2h calculates an average of the linear prediction coefficients corresponding to one block (the predetermined block), for each of the subblocks, based on the respective linear prediction coefficients thus calculated. Then, the weighting prediction coefficient calculation unit 2h calculates weighting linear prediction parameters corresponding to one block based on an average of each of the subblocks. Concrete explanation is as follows.

Firstly, the calculation unit 2h calculates a plurality of averages of equivalent coefficients (linear prediction parameters) of the linear prediction coefficients of each analysis frame. For example, assumptions are made herein that the prediction coefficients of the analysis frame 1 are $\alpha 11$, $\alpha 12$, $\alpha 13$, and so on, that the prediction coefficients of the analysis frame 2 are $\alpha 21$, $\alpha 22$, $\alpha 23$, and so on, that the prediction coefficients of the analysis frame 3 are $\alpha 31$, $\alpha 32$, $\alpha 33$, and so on, and that the prediction coefficients of the analysis frame 4 are $\alpha 41$, $\alpha 42$, $\alpha 43$, and so on. Here, that the second-digit suffix added to each of the prediction coefficients is same number means that each of the prediction coefficients is associated with same order of linear prediction analysis.

The weighting prediction coefficient calculation unit 2h obtains LSP (the linear prediction parameters) by performing the transforming process from the prediction coefficients α into the LSP. As a result of this transforming process, the LSP of the analysis frame 1 are L11, L12, L13, and so on, the LSP of the analysis frame 2 are L21, L22, L23, and so on, the LSP of the analysis frame 3 are L31, L32, L33, and so on, and the LSP of the analysis frame 4 are L41, L42, L43, and so on.

Then, the weighting prediction coefficient calculation unit 2h calculates the plurality of averages in accordance with the following formulae, for example. Alternatively, the calculation unit 2h may calculate the averages by way of a technique based on weighted average, for example.

$$(L11+L21+L31+L41)/4=LAVE1$$

$$(L12+L22+L32+L42)/4=LAVE2$$

In this way, the respective averages of the LSP (LAVE1, LAVE2, and so on) are calculated. The respective averages of the LSP (LAVE1, LAVE2, and so on) are the averages of coefficients concerning linear prediction coefficients corresponding to one block (the predetermined block).

Then, the weighting prediction coefficient calculation unit 2h obtains respective weighting prediction coefficients ($\alpha$AVE1, $\alpha$AVE2, and so on) by transforming the respective averages of the LSP (LAVE1, LAVE2, and so on) into linear prediction coefficients. The respective weighting prediction coefficients ($\alpha$AVE1, $\alpha$AVE2, and so on) correspond to the above-described weighting linear prediction parameters corresponding to one block (the predetermined block). The respective weighting prediction coefficients are transmitted to the weight generation unit 2i.

The weight generation unit 2i generates a weight (weight corresponding to one block) related to the degree concerning whether or not quantization noise corresponding to an error signal for one block is virtually imperceptible for the user based on the respective weighting prediction coefficients. For example, the weight generation unit 2i generates a publicly-known formant perceptual weighting filter.

Meanwhile, the weighting execution unit 10 may have the following function instead of the function in the embodiments 1 and 2. The weighting execution unit 10 generates a weighted error signal for one block (second weighted error signal) by providing the error signal for one block with the above-described weight corresponding to one block.

Moreover, the quantization method selection unit 12 may have the following function instead of the function in the embodiments 1 and 2. When a plurality (number of second weighted error signals for one block) of second weighted error signals are generated, the quantization method selection unit 12 may compare the plurality of second weighted error signals with one another and select a given quantization method from among a plurality of quantization methods based on a result of the comparison.

Note that the weight calculation unit 2, the weighting execution unit 10, and the quantization method selection unit 12 may have the functions in the embodiments 1 and 2 as well as the functions in this modification.

In this modification, frequency characteristics corresponding to respective subblocks are taken into account for the respective weighting prediction coefficients. For this reason, when the comparing process of the quantization noise provided with the weight generated by the weight generation unit 2i is performed and the quantizing process is performed by use of a given quantization method selected based on the result of the comparison, the quantization noise in each subblock is caused to be almost inaudible for the user.

Accordingly, the same effects as those obtained in the embodiments 1 and 2 are also obtained in this modification.

Modification 5

In the signal encoding apparatuses shown in the embodiments 1 and 2, the weight calculation unit 2 may have the following functions instead of the functions in the embodiments 1 and 2.

Figure 10:
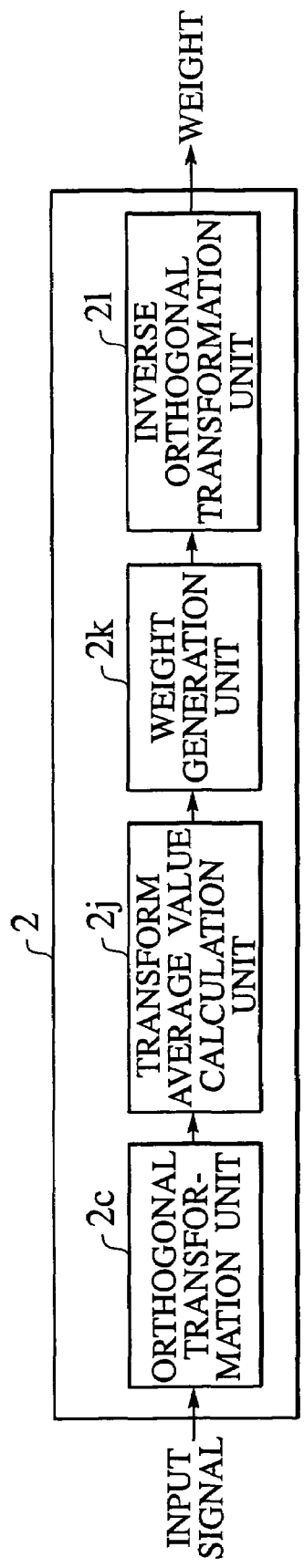
FIG. 10 is a view showing a configuration of a weight calculation unit in a modification 5.

FIG. 10 is a view showing a configuration of the weight calculation unit 2 in a modification 5. The weight calculation unit 2 includes an orthogonal transformation unit 2c, a transformation average value calculation unit 2j, a weight generation unit 2k, and an inverse orthogonal transformation unit 2l.

The orthogonal transformation unit 3 transforms (orthogonally transforms) an input signal into a transformed signal for each of the subblocks included in one block. Then, the orthogonal transformation unit 3 transmits transformed signal values corresponding to each subblock and the frequency corresponding to each transformed signal value to the transformation average value calculation unit 2j.

The transformation average value calculation unit 2j calculates. based on the respective transformed signal values subjected to linear transformation, transformation average values corresponding to the predetermined block, each indicating an average of the transformed signal values. Note that the method of calculating an average as described below is merely an example. The transformation average value calculation unit 2j may calculate the averages by way of a technique based on weighted average, for example.

For instance, assumptions are made herein that the respective transformed signal values corresponding to the subblock 1 are f11, f12, f13, and so on, that the respective transformed signal values corresponding to the subblock 2 are f21, f22, f23, and soon, that the respective transformed signal values corresponding to the subblock 3 are f31, f32, f33, and so on, and that the respective transformed signal values corresponding to the subblock 4 are f41, f42, f43, and so on. That the second-digit suffix added to each of the transformed signal values is same number means that the frequency corresponding to each of the transformed signal values is same.

Then, the average calculation unit 2j calculates the averages as described in the following formulas, for example. Alternatively, the average calculation unit 2j may calculate the averages by way of a technique based on weighted average, for example.

$$(f11+f21+f31+f41)/4=fAVE1$$

$$(f12+f22+f32+f42)/4=fAVE2$$

The respective average values (fAVE1, fAVE2, and so on) of the transformed signal values correspond to the transformation average values corresponding to one block (the predetermined block). Thereafter, the transformation average values corresponding to one block is transmitted to the weight generation unit 2k.

The weight generation unit 2k generates a weight (a weight corresponding to one block) related to the degree concerning whether or not the quantization noise corresponding to the error signal for one block (the predetermined block) is virtually imperceptible for the user based on the transformation average values corresponding to one block. The inverse orthogonal transformation unit 21 performs an inverse orthogonal transforming process of the generated weight. By this process, the weight in the frequency domain is transformed into the weight in the time domain.

Meanwhile, the weighting execution unit 10 may have the following function instead of the function in the embodiments 1 and 2. The weighting execution unit 10 generates a weighted error signal for one block (second weighted error signal) by providing the error signal for one block with the above-described weight corresponding to one block.

Meanwhile, the quantization method selection unit 12 may have the following function instead of the function in the embodiments 1 and 2. When a plurality (number of second weighted error signals for one block) of second weighted error signals are generated, the quantization method selection unit 12 may compare the plurality of second weighted error signals with one another and select a given quantization method from among a plurality of quantization methods based on a result of the comparison.

Incidentally, the weight calculation unit 2, the weighting execution unit 10, and the quantization method selection unit 12 may have the functions in the embodiments 1 and 2 as well as the functions in this modification.

In this modification, frequency characteristics corresponding to respective subblocks are taken into account for the respective averages of the transformed signal values (the transformation average values corresponding to one block) For this reason, when the comparing process of the quantization noise provided with the weight generated by the weight generation unit 2i is performed and the quantizing process is performed by use of a given quantization method selected based on the result of the comparison, the quantization noise in each subblock becomes almost inaudible for the user. Accordingly, the same effects as those obtained in the embodiments 1 and 2 are also obtained in this modification.

Modification 6

Figure 11:
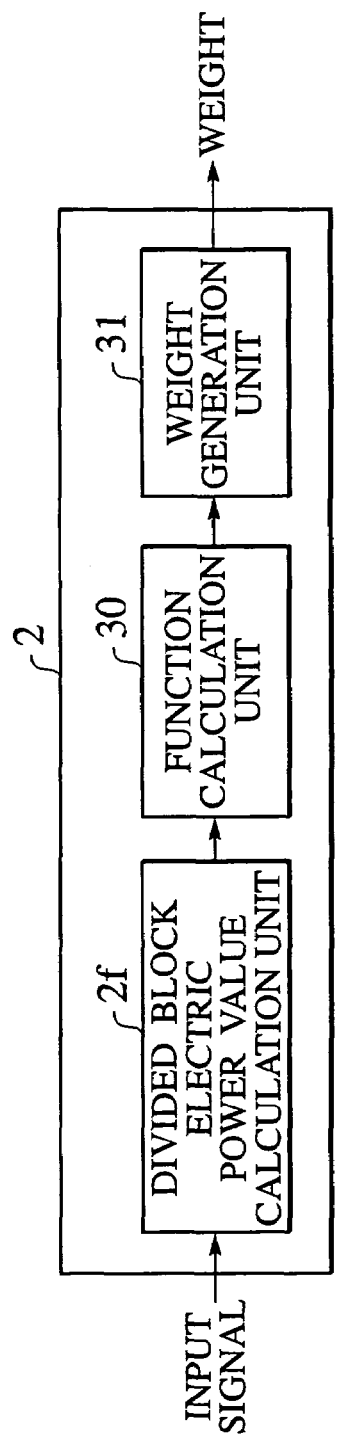
FIG. 11 is a view showing a configuration of a weight calculation unit in a modification 6.

In the signal encoding apparatuses shown in the embodiments 1 and 2, the weight calculation unit 2 may have the following functions instead of the functions in the embodiments 1 and 2. FIG. 11 is a view showing a configuration of the weight calculation unit 2 in a modification 6. The weight calculation unit 2 includes a subblock electric power value calculation unit 2f, a function calculation unit 30, and a weight generation unit 31.

The subblock electric power value calculation unit (a signal electric power value calculation unit) 2f calculates, for each of the subblocks included in one block, a signal electric power value (signal electric power value relative to time) indicating an electric power value of the input signal of the subblock. Here, the signal electric power value is a value indicating a sum of electric power values of input signal values corresponding to each subblock. Then, the respective signal electric power values are transmitted to the function calculation unit 30.

The function calculation unit 30 calculates an electric power function indicating distribution of the signal electric power values corresponding to one block (the predetermined block) based on the respective signal electric power values thus calculated.

For example, when the signal electric power value corresponding to the subblock 1 is W1, the signal electric power value corresponding to the subblock 2 is W2, the signal electric power value corresponding to the subblock 3 is W3, and the signal electric power value corresponding to the subblock 4 is W4, the function calculation unit 30 performs the following processing. The function calculation unit 30 calculates the electric power function corresponding to one block by way of a linear interpolation method, for example, using these signal electric power values (W1 to W4). Then, the calculated electric power function is transmitted to the weight generation unit 31.

Based on the electric power function, the weight generation unit 31 generates a weight related to the degree concerning whether or not the quantization noise corresponding to the error signal for one block is virtually imperceptible for the user. Concrete explanation is as follows. The weight generation unit 31 calculates an envelope of each signal electric power value (an envelope of each electric power value in the time domain) based on the electric power function. Then, the weight generation unit 31 generates the weight corresponding to one block (the predetermined block) based on the envelope of the signal electric power value.

The weighting execution unit 10 may have the following function instead of the function in the embodiments 1 and 2. The weighting execution unit 10 generates a weighted error signal for one block (second weighted error signal) by providing the error signal for one block with the above-described weight corresponding to one block.

The quantization method selection unit 12 may have the following function instead of the function in the embodiments 1 and 2. When a plurality of second weighted error signals are generated, the quantization method selection unit 12 may compare the plurality of second weighted error signals with one another and select a given quantization method from among a plurality of quantization methods based on a result of the comparison.

The weight calculation unit 2, the weighting execution unit 10, and the quantization method selection unit 12 may have the functions in the embodiments 1 and 2 as well as the functions in this modification. The same effects as those obtained in the embodiments 1 and 2 are also obtained in this modification. In addition, although description has been given on voice signals in this embodiment and the respective modifications, the present invention is also applicable to image signals and the like.

Program and Recording Medium

Figure 12:
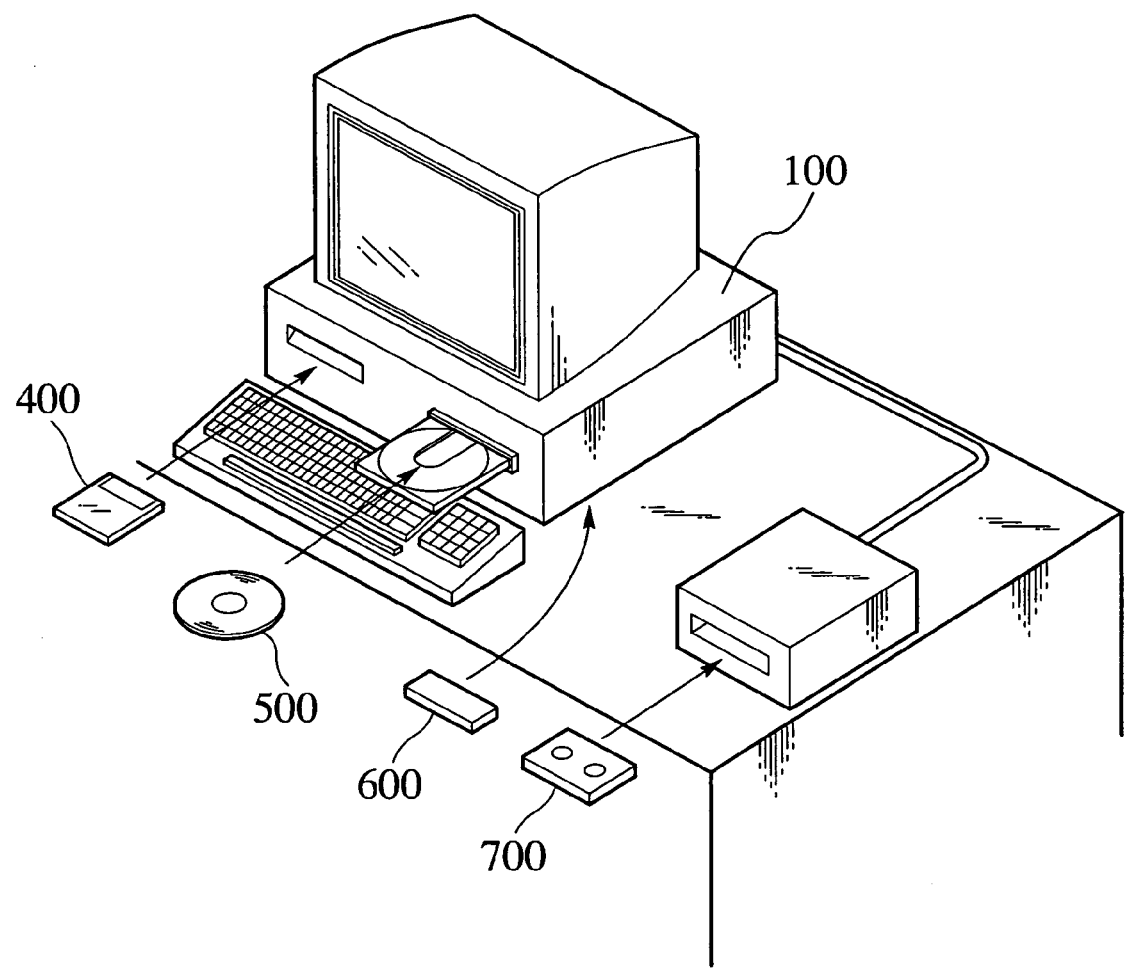
FIG. 12 is a view showing a computer-readable recording medium recording a program according to the present invention.

By the way, a program for causing a computer to implement the functions of the signal encoding apparatus of the embodiment 1 or 2 or any of the respective modifications can be recorded in a computer-readable recording medium. As shown in FIG. 12, this computer-readable recording medium includes, for example, a hard disk 100, a flexible disk 400, a compact disc 500, an IC chip 600, and a cassette tape 700. Storage, transport, or sale of the program is easily conducted by use of such a recording medium recording the program.

INDUSTRIAL PRACTICABILITY

As described above, according to the present invention, the given quantization method (such as the quantization method which renders quantization noise corresponding to an error signal of each subblock sufficiently virtually imperceptible for the user) is selected from among the plurality of quantization methods.

By performing the quantizing process based on the quantization method thus selected as described above, the following effects are obtained even when the characteristics of the input signal vary for consecutive short time periods. Specifically, the user hardly perceive the quantization noise included in the decoded signal. Moreover, reduction in frequency resolution and reduction in encoding efficiency are prevented. As a result, it is possible to improve subjective quality of voice signals and sound signals.

The invention claimed is:

1. A signal encoding apparatus configured to quantize an input voice signal, to encode the input voice signal quantized, and then to output the input voice signal encoded as an output signal, the signal encoding apparatus comprising:
    a quantizer configured to quantize the input voice signal of a predetermined block based on a plurality of quantization methods and to generate a plurality of quantized signals;
    a dequantizer configured to obtain a plurality of decoded signals by respectively dequantizing the plurality of quantized signals;
    an error signal calculator configured to calculate a plurality of error signals of the predetermined block, each of which indicates a difference between each of the plurality of decoded signals and the input voice signal;
    a weight calculator configured to calculate, for respective short blocks included in the predetermined block, weights negatively-correlated with frequency power spectrums of the input voice signal corresponding to the short blocks included in the predetermined block;
    a weighted error signal generator configured to weight the plurality of error signals corresponding to the short blocks respectively, by using the weights calculated by the weight calculator, and to generate a plurality of weighted error signals;
    an electric power calculator configured to calculate electric power values of the plurality of weighted error signals respectively, and
    a quantization method selector configured to compare the electric power values of the plurality of weighted error signals with one another, and to select a quantization method from among the plurality of quantization methods based on a result of the comparison;
    an encoder configured to encode the input signal which is quantized based on the selected quantization method; and
    an outputting unit configured to output the input voice signal encoded as an output signal.

2. The signal encoding apparatus according to claim 1, wherein the short blocks include a plurality of subblocks into which the predetermined block is divided.

3. The signal encoding apparatus according to claim 1, further comprising:
    an instructing unit configured, when a predetermined quantization method is selected by the quantization method selector, to instruct the quantizer not to perform quantization based on any quantization method other than the predetermined quantization method.

4. The signal encoding apparatus according to claim 1, further comprising:
    a quantization method generator configured to generate the plurality of quantization methods based on an amount of information of encoding terms necessary for expressing the output signal to be outputted from the output unit.

5. The signal encoding apparatus according to claim 1, further comprising:
    a prediction analyzer configured to calculate a plurality of linear prediction parameters by performing a linear prediction analysis of the input signal for the respective short blocks included in the predetermined block,
    wherein the calculator is configured to calculate the weights for the respective short blocks, based on the linear prediction parameters calculated by the prediction analyzer.

6. The signal encoding apparatus according to claim 1, further comprising:
    a transformer configured to perform a linear transformation of the input signal into transformed signals for the respective short blocks; and an inverse transformer configured to perform an inverse linear transformation of the weights calculated by the weight calculator, wherein the weight calculator is configured to calculate the weights for the respective short blocks, based on the transformed signals.

7. A signal encoding method for quantizing an input voice signal, for encoding the input signal quantized, and then for outputting the input voice signal encoded as an output signal, the signal encoding method comprising:

a quantization step of quantizing the input voice signal of a predetermined block based on a plurality of quantization methods to generate a plurality of quantized signals;

a step of obtaining a plurality of decoded signals by respectively dequantizing the plurality of quantized signals;

a step of calculating a plurality of error signals of the predetermined block, each of which indicates a difference between each of the plurality of decoded signals and the input voice signal;

a weight calculation step of calculating, for respective short blocks included in the predetermined block, weights negatively-correlated with frequency power spectrums of the input voice signal corresponding to the short blocks included in the predetermined block;

a weighting step of weighting the plurality of error signals corresponding to the short blocks respectively, by using the weights calculated by the weight calculation step, and generating a plurality of weighted error signals;

an electric power calculation step of calculating electric power values of the plurality of weighted error signals respectively, and a first selection step of comparing the electric power values of the plurality of weighted error signals with one another, and of selecting a quantization method from among the plurality of quantization methods based on a result of the comparing the electric power values;

an encoding step of encoding the input voice signal which is quantized based on the selected quantization method; and a step of outputting the input voice signal encoded as an output signal.

8. The signal encoding method according to claim 7, wherein the short blocks include a plurality of subblocks into which the predetermined block is divided.

9. The signal encoding method according to claim 7, further comprising:

a step of instructing a unit configured to perform the quantization step so as not to perform quantization based on any quantization method other than a predetermined quantization method, when the predetermined quantization method is selected in the first selection step.

10. The signal encoding method according to claim 7, further comprising:

a step of generating the plurality of quantization methods based on an amount of information of encoding terms necessary for expressing the output signal to be outputted.

11. The signal encoding method according to claim 7, further comprising:

a step of calculating a plurality of linear prediction parameters by performing a linear prediction analysis of the input signal for the respective short subblocks included in the predetermined block, wherein the step of calculating calculates the weights for the respective short blocks, based on the linear prediction parameters calculated by said calculating the linear prediction analysis.

12. The signal encoding method according to claim 7, further comprising:

a step of performing a linear transformation of the input signal into transformed signals for the respective short blocks; and a step of reverse transforming to perform an inverse linear transformation of the weights calculated by the weight calculating step, wherein the weight calculating step calculates the weights for respective short blocks, based on the transformed signals.

13. A computer readable recording medium having a program stored thereon for performing quantization of an input voice signal, for encoding the quantized input voice signal, and then for outputting the encoded input voice signal as an output signal, the program causing a computer to execute processing comprising:

a quantization step of quantizing the input voice signal of a predetermined block based on a plurality of quantization methods to generate a plurality of quantized signals;

a step of obtaining a plurality of decoded signals by respectively dequantizing the plurality of quantized signals;

a step of calculating a plurality of error signals of the predetermined block, each of which indicates a difference between each of the plurality of decoded signals and the input voice signal;

a weight calculation step of calculating, for respective short blocks included in the predetermined block, weights negatively-correlated with frequency power spectrums of the input voice signal corresponding to the short blocks included in the predetermined block;

a weighting step of weighting the plurality of error signals corresponding to the short blocks respectively, by using the weights calculated by the weight calculation step, and generating a plurality of weighted error signals;

an electric power calculation step of calculating electric power values of the plurality of weighted error signals respectively, and a first selection step of comparing the electric power values of the plurality of weighted error signals with one another, and of selecting a quantization method from among the plurality of quantization methods based on a result of the comparing the electric power values;

an encoding step of encoding the input voice signal which is quantized based on the selected quantization method; and a step of outputting the input voice signal encoded as an output signal.

14. The computer readable recording medium according to claim 13, wherein the short blocks include a plurality of subblocks into which the predetermined block is divided.

15. The computer readable recording medium according to claim 13, wherein the program causes the computer to execute processing further comprising a step of instructing a unit configured to perform the quantization step so as not to perform quantization based on any quantization method other than a predetermined quantization method, when the predetermined quantization method is selected in the first selection step.

16. The computer readable recording medium according to claim 13, the program causing the computer to execute processing further comprising a step of generating the plurality of quantization methods based on an amount of information of encoding terms necessary for expressing the output signal to be outputted.

17. The computer readable recording medium according to claims 13, further comprising:
a step of calculating a plurality of linear prediction parameters by performing a linear prediction analysis of the input signal for the respective short subblocks included in the predetermined block,
wherein the step of calculating calculates the weights for the respective short blocks, based on the linear prediction parameters calculated by said calculating the linear prediction analysis.

18. The computer readable recording medium according to claim 13, further comprising:
a step of performing a linear tansformation of the input signal into transformed signals for the respective short blocks; and
a step of reverse transforming to perform an inverse linear transformation of the weights calculated by the weight calculating step,
wherein the weight calculating step calculates the weights for respective short blocks, based on the transformed signals.

19. A signal encoding apparatus configured to quantize an input voice signal, to encode the input voice signal quantized, and then to output the input voice signal encoded as an output signal, the signal encoding apparatus comprising:
a quantizer configured to quantize the input voice signal of a predetermined block based on a plurality of quantization methods and to generate a plurality of quantized signals;
a dequantizer configured to obtain a plurality of decoded signals by respectively dequantizing the plurality of quantized signals;
an error signal calculator configured to calculate a plurality of error signals of the predetermined block, each of which indicates a difference between each of the plurality of decoded signals and the input voice signal;
a weight calculator configured to calculate, for the predetermined block, a weight negatively-correlated with frequency power spectrums of the input voice signal corresponding to short blocks included in the predetermined block;
a weighted error signal generator configured to weight the plurality of error signals corresponding to the predetermined block, by using the weight calculated by the weight calculator, and to generate a plurality of weighted error signals;
an electric power calculator configured to calculate electric power values of the plurality of weighted error signals respectively;
a quantization method selector configured to compare the electric power values of the plurality of weighted error signals with one another, and to select a quantization method from among the plurality of the quantization methods based on a result of the comparison;
an encoder configured to encode the input voice signal which is quantized based on the selected quantization method; and
an outputting unit configured to output the input voice signal encoded as an output signal.

20. The signal encoding apparatus according to claim 19, further comprising:
a prediction analyzer configured to calculate a plurality of linear prediction parameters by performing a linear prediction analysis of the input signal for the respective short blocks in the predetermined block;
an average calculator configured to calculate an average of the plurality of linear prediction parameters calculated by the prediction analyzer, the average corresponding to the predetermined block; and
a weighting prediction parameter calculator configured to calculate a weighting linear prediction parameter corresponding to the predetermined block, based on the average calculated by the average calculator,
wherein the weight calculator is configured to calculate the weight for the predetermined block, based on the weighting linear prediction parameter calculated by the weighting prediction parameter.

21. The signal encoding apparatus according to claim 19, further comprising:
a transformer configured to perform a linear transformation of the input signal into transformed signals for the respective short blocks;
a transformation average value calculator configured to calculate, based on transformed signal values which are respective values of the transformed signals, an average of the transformation signal values, the average corresponding to the predetermined block; and
an inverse transformer configured to perform an inverse linear transformation of the weight calculated by the weight calculator,
wherein the weight calculator is configured to calculate the weight for the predetermined block, based on the average of the transformation signal values.

22. The signal encoding apparatus according to claim 19, wherein the short blocks include a plurality of subblocks into which the predetermined block is divided.

23. The signal encoding apparatus according to claim 19, further comprising:
an instructing unit configured, when a predetermined quantization method is selected by the quantization method selector, to instruct the quantizer not to perform quantization based on any quantization method other than the predetermined quantization method.

24. The signal encoding apparatus according to claim 19, further comprising:
a quantization method generator configured to generate the plurality of quantization methods based on an amount of information of encoding terms necessary for expressing the output signal to be outputted from the output unit.

25. A signal encoding apparatus configured to quantize an input voice signal to encode the input voice signal quantized, and then to output the input voice signal encoded as an output signal, the signal encoding apparatus comprising:
a quantizer configured to quantize the input voice signal of a predetermined block based on a plurality of quantization methods and to generate a plurality of quantized signals;
a dequantizer configured to obtain a plurality of decoded signals by respectively dequantizing the plurality of quantized signals;
an error signal calculator configured to calculate a plurality of error signals of the predetermined block, each of which indicates a difference between each of the plurality of decoded signals and the input voice signal;
a signal electric power value calculator configured to calculate signal electric power values indicating electric power values of the input voice signal for respective short blocks included in the predetermined block on a temporal axis; and a weight calculator configured to calculate, for respective short blocks included in the predetermined block weights negatively-correlated with the calculated signal electric power values corresponding to the short blocks included in the predetermined block;

a weighted error signal generator configured to weight the plurality of error signals corresponding to the short blocks respectively, by using the weights calculated by the weight calculator, and to generate a plurality of weighted error signals;

an electric power calculator configured to calculate electric power values of the plurality of weighted error signals respectively;

a quantization method selector configured to compare the electric power values of the plurality of weighted error signals with one another, and to select a quantization method from among the plurality of the quantization methods based on a result of the comparison;

an encoder configured to encode the input voice signal which is quantized based on the selected quantization method; and an outputting unit configured to output the input voice signal encoded as an output signal.

26. The signal encoding apparatus according to claim 25, wherein the short blocks include a plurality of subblocks into which the predetermined block is divided.

27. The signal encoding apparatus according to claim 25, further comprising:

an instructing unit configured, when a predetermined quantization method is selected by the quantization method selector, to instruct the quantizer not to perform quantization based on any quantization method other than the predetermined quantization method.

28. The signal encoding apparatus according to claim 25, further comprising:

a quantization method generator configured to generate the plurality of quantization methods based on an amount of information of encoding terms necessary for expressing the output signal to be outputted from the output unit.

29. A signal encoding apparatus configured to quantize an input voice signal, to encode the input voice signal quantized, and then to output the input voice signal encoded as an output signal, the signal encoding apparatus comprising:

a quantizer configured to quantize the input voice signal of a predetermined block based on a plurality of quantization methods and to generate a plurality of quantized signals;

a dequantizer configured to obtain a plurality of decoded signals by respectively dequantizing the plurality of quantized signals;

an error signal calculator configured to calculate a plurality of error signals of the predetermined block, each of which indicates a difference between each of the plurality of decoded signals and the input voice signal;

a signal electric power value calculator configured to calculate signal electric power values indicating electric power values of the input voice signal for respective short blocks included in the predetermined block on a temporal axis;

a function calculator configured to calculate, based on respective signal electric power values thus calculated, an electric power function corresponding to the predetermined block, the electric power function indicating distribution of the respective signal electric power values;

a weight calculator configured to calculate, for the predetermined block, a weight negatively-correlated with electric power function calculated by the function calculator;

an weighted error signal generator configured to weight the plurality of error signals corresponding to the predetermined block, by using the weight calculated by the weight calculator, and to generate a plurality of weighted error signals;

an electric power calculator configured to calculate electric power values of the plurality of weighted error signals respectively;

a quantization method selector configured to compare the electric power values of the plurality of weighted error signals with one another, and to select a quantization method from among the plurality of the quantization methods based on a result of the comparison;

an encoder configured to encode the input voice signal which is quantized based on the selected quantization method; and an outputting unit configured to output the input voice signal encoded as an output signal.

30. The signal encoding apparatus according to claim 29, wherein the short blocks include a plurality of subblocks into which the predetermined block is divided.

31. The signal encoding apparatus according to claim 29, further comprising:

an instructing unit configured, when a predetermined quantization method is selected by the quantization method selector, to instruct the quantizer not to perform quantization based on any quantization method other than the predetermined quantization method.

32. The signal encoding apparatus according to claim 29, further comprising:

a quantization method generator configured to generate the plurality of quantization methods based on an amount of information of encoding terms necessary for expressing the output signal to be outputted from the output unit.

* * * * *